(12) United States Patent
Bogue et al.

(10) Patent No.: US 10,040,235 B2
(45) Date of Patent: Aug. 7, 2018

(54) EXTRUSION DEVICE FOR THREE-DIMENSIONAL DRAWING

(71) Applicant: WobbleWorks, Inc., Wilmington, DE (US)

(72) Inventors: Maxwell Bogue, Wellesley, MA (US); Thomas Walker, Shenzhen (CN)

(73) Assignee: WOBBLEWORKS, INC., Wilmington, DE (US)

( * ) Notice: Subject to any disclaimer, the term of this patent is extended or adjusted under 35 U.S.C. 154(b) by 591 days.

(21) Appl. No.: 14/586,812

(22) Filed: Dec. 30, 2014

(65) Prior Publication Data
US 2016/0185028 A1 Jun. 30, 2016

(51) Int. Cl.
| | |
|---|---|
| *B29C 47/92* | (2006.01) |
| *B29C 47/08* | (2006.01) |
| *B29C 67/00* | (2017.01) |
| *B29C 47/86* | (2006.01) |
| *B33Y 30/00* | (2015.01) |
| *B29C 47/00* | (2006.01) |
| *B29C 64/106* | (2017.01) |

(Continued)

(52) U.S. Cl.
CPC .......... *B29C 47/92* (2013.01); *B29C 47/0002* (2013.01); *B29C 64/106* (2017.08); *B29C 64/386* (2017.08); *B33Y 30/00* (2014.12); *B29C 47/0813* (2013.01); *B29C 47/862* (2013.01); *B29C 47/864* (2013.01); *B29C 2947/926* (2013.01); *B29C 2947/9258* (2013.01); *B29C 2947/92076* (2013.01); *B29K 2105/253* (2013.01); *B29K 2827/18* (2013.01); *B29K 2905/00* (2013.01); *B33Y 50/02* (2014.12)

(58) Field of Classification Search
CPC . B29C 47/92; B29C 47/0002; B29C 47/0813; B29C 47/862; B29C 47/864; B29C 67/0055
See application file for complete search history.

(56) References Cited

U.S. PATENT DOCUMENTS

| | | |
|---|---|---|
| 3,281,576 A | 10/1966 | Cooper |
| 3,559,241 A | 2/1971 | Chu |

(Continued)

FOREIGN PATENT DOCUMENTS

| | | |
|---|---|---|
| CN | 1285856 A | 2/2001 |
| CN | 2761402 Y | 3/2006 |

(Continued)

OTHER PUBLICATIONS

Machine translation of CN103341975A, Proquest, 9 pages (Year: 2017).*

(Continued)

*Primary Examiner* — Yogendra N Gupta
*Assistant Examiner* — Emmanuel S Luk
(74) *Attorney, Agent, or Firm* — Nathan S. Smith; Danny M. Mansour; McDermott Will & Emery LLP

(57) ABSTRACT

An extrusion device includes a filament-engaging mechanism that urges a filament, received by the device, through a heater and a nozzle. A moveable control member can be manipulated by a user during operation of the device to alter a rate of extrusion. The extrusion device can have a continuous flow mode of operation. The extrusion device can be configured to operate with low electrical power consumption.

23 Claims, 14 Drawing Sheets

(51) Int. Cl.
*B29C 64/386* (2017.01)
*B29K 105/00* (2006.01)
*B33Y 50/02* (2015.01)

(56) References Cited

U.S. PATENT DOCUMENTS

| | | | |
|---|---|---|---|
| 3,604,597 | A | 9/1971 | Pohl et al. |
| 3,665,158 | A | 5/1972 | Froedge |
| 3,887,319 | A | 6/1975 | Cottingham |
| 4,059,204 | A | 11/1977 | Duncan et al. |
| 4,552,287 | A | 11/1985 | Dziki |
| 4,597,821 | A | 7/1986 | Munro |
| 4,681,524 | A | 7/1987 | Ikeda et al. |
| 5,121,329 | A | 6/1992 | Crump |
| 5,169,587 | A | 12/1992 | Courval |
| 5,340,433 | A | 8/1994 | Crump |
| 5,843,490 | A | 12/1998 | Horiba et al. |
| 5,853,774 | A | 12/1998 | Dreve |
| 6,129,872 | A | 10/2000 | Jang |
| 6,162,378 | A | 12/2000 | Bedal et al. |
| 6,238,613 | B1 | 5/2001 | Batchelder et al. |
| 6,460,481 | B1 | 10/2002 | Young |
| 6,500,374 | B1 | 12/2002 | Akioka et al. |
| 6,558,059 | B1 | 5/2003 | Hillinger et al. |
| 6,776,602 | B2 | 8/2004 | Swanson et al. |
| 8,221,669 | B2 | 7/2012 | Batchelder et al. |
| 8,236,227 | B2 | 8/2012 | Batchelder et al. |
| 8,262,304 | B2 | 9/2012 | Llach et al. |
| 8,439,665 | B2 | 5/2013 | Batchelder et al. |
| 8,926,882 | B2 | 1/2015 | Batchelder et al. |
| 9,067,458 | B1 | 6/2015 | Mock |
| 9,102,098 | B2 | 8/2015 | Dilworth et al. |
| 2001/0030383 | A1 | 10/2001 | Swanson et al. |
| 2001/0033037 | A1 | 10/2001 | Nitschke et al. |
| 2003/0137077 | A1 | 7/2003 | Lee et al. |
| 2004/0232165 | A1 | 11/2004 | Lee |
| 2005/0129941 | A1 | 6/2005 | Comb et al. |
| 2005/0288813 | A1 | 12/2005 | Yang et al. |
| 2006/0051442 | A1 | 3/2006 | Miceli et al. |
| 2007/0003656 | A1 | 1/2007 | LaBossiere et al. |
| 2007/0029693 | A1 | 2/2007 | Wigand et al. |
| 2007/0228590 | A1 | 10/2007 | LaBossiere et al. |
| 2008/0197116 | A1 | 8/2008 | Achtner et al. |
| 2008/0213419 | A1 | 9/2008 | Skubic et al. |
| 2009/0274540 | A1 | 11/2009 | Batchelder et al. |
| 2009/0283544 | A1* | 11/2009 | Salmela ........... A47J 31/40 222/146.5 |
| 2010/0147465 | A1 | 6/2010 | Di Miceli et al. |
| 2010/0166969 | A1 | 7/2010 | Batchelder |
| 2010/0327479 | A1 | 12/2010 | Zinniel et al. |
| 2011/0074065 | A1 | 3/2011 | Batchelder et al. |
| 2011/0076496 | A1 | 3/2011 | Batchelder et al. |
| 2011/0079936 | A1 | 4/2011 | Oxman |
| 2011/0196660 | A1 | 8/2011 | Liu et al. |
| 2012/0070523 | A1 | 3/2012 | Swanson et al. |
| 2012/0219699 | A1 | 8/2012 | Pettersson et al. |
| 2012/0258190 | A1 | 10/2012 | Batchelder et al. |
| 2013/0209600 | A1 | 8/2013 | Tow |
| 2013/0234366 | A1 | 9/2013 | Batchelder et al. |
| 2014/0044823 | A1* | 2/2014 | Pax ................ B29C 47/12 425/143 |
| 2014/0120197 | A1* | 5/2014 | Swanson ............. B29C 47/0002 425/378.1 |
| 2014/0154347 | A1 | 6/2014 | Dilworth et al. |
| 2014/0159273 | A1 | 6/2014 | Koop et al. |
| 2014/0291886 | A1 | 10/2014 | Mark et al. |
| 2014/0328963 | A1* | 11/2014 | Mark .................. B29C 67/0088 425/143 |
| 2015/0096717 | A1* | 4/2015 | Batchelder .......... B29C 67/00 165/64 |
| 2015/0137402 | A1* | 5/2015 | Schmehl ................ B33Y 10/00 264/39 |
| 2015/0147427 | A1* | 5/2015 | Lundwall ............ B29C 67/0085 425/375 |
| 2015/0165691 | A1* | 6/2015 | Mark .................. B29C 67/0088 700/98 |
| 2015/0331412 | A1* | 11/2015 | Adair ................ G05B 19/4145 700/126 |
| 2016/0031141 | A1 | 2/2016 | Dilworth et al. |
| 2016/0031159 | A1* | 2/2016 | Church ............... B29C 67/0085 264/308 |
| 2016/0185028 | A1 | 6/2016 | Bogue et al. |
| 2017/0057168 | A1* | 3/2017 | Miller ................ B29C 67/0085 |
| 2017/0120519 | A1* | 5/2017 | Mark .................. B29C 67/0081 |
| 2017/0157826 | A1* | 6/2017 | Hishiki ............... B29C 47/0014 |

FOREIGN PATENT DOCUMENTS

| | | |
|---|---|---|
| CN | 2813176 Y | 9/2006 |
| CN | 101166597 A | 4/2008 |
| CN | 101172428 A | 5/2008 |
| CN | 201086388 Y | 7/2008 |
| CN | 202079738 U | 12/2011 |
| CN | 202399493 U | 8/2012 |
| CN | 102922721 A | 2/2013 |
| CN | 103341975 A | 10/2013 |
| CN | 203357906 U * | 12/2013 |
| CN | 203357906 U | 12/2013 |
| CN | 302680797 S | 12/2013 |
| CN | 203371791 U * | 1/2014 |
| CN | 203449607 U * | 2/2014 |
| CN | 103707511 A * | 4/2014 |
| CN | 302781312 S | 4/2014 |
| CN | 203592687 U | 5/2014 |
| CN | 203752533 U | 8/2014 |
| CN | 203752534 U | 8/2014 |
| CN | 104040040 A | 9/2014 |
| DE | 3341201 A1 | 5/1985 |
| EM | 002315440-0001 | 9/2013 |
| EM | 002315440-0002 | 9/2013 |
| EP | 0257838 A2 | 3/1988 |
| EP | 2957420 A1 | 12/2015 |
| JP | S 61-141959 A | 8/1988 |
| JP | S63-205216 A | 8/1988 |
| WO | WO-99/32544 A1 | 7/1999 |
| WO | WO-2009/134298 A2 | 11/2009 |
| WO | WO-2012/088257 A1 | 6/2012 |
| WO | WO-2012/152510 A1 | 11/2012 |
| WO | WO-2012/152511 A1 | 11/2012 |
| WO | WO-2014/088681 A1 | 6/2014 |
| WO | WO-2015/020944 A1 | 2/2015 |
| WO | WO-2015/193490 A2 | 12/2015 |
| WO | WO-2016/108950 A1 | 7/2016 |

OTHER PUBLICATIONS

Machine translation of CN103707511A, publication of original document Apr. 9, 2014, 15 pages. (Year: 2017).*

Techspan Group, "A range of Leister hand-held and automatic welders from Techspan," Dec. 12, 2006, retrieved from http://www.ferret.com.au/c/techspan-group/a-range-of-Leister-hand-held-automatic-welders-from-Techspan-n667443.

Donutman.sub.—2000 "Plastic Welding Gun (Plastruder MK4)" published Sep. 19, 2010, retrieved from http://www.thingiverse.com/thing:4156.

MonUnivers3D: 3Ddoodler, a 3D drawing pen, Aug. 9, 2013, retrieved from http://www.monunivers3d.com/1493.

Heater, "SwissPen 3D printing pen brings 3Doodler competition well before launch," Aug. 21, 2103, retrieved from www.engadget.com/2013/08/21/swisspen/.

Fincher, "Move over 3Doodler—here comes the SwissPen," Aug. 23, 2013, retrieved from http://newatlas.com/swisspen-handheld-3d-printer/28799/.

Bryant, "Adobe moves into hardware: Project Mighty 'cloud pen' and Project Napoleon ruler to launch in 2014," Sep. 17, 2013, retrieved from wwe.thenextweb.com/gadgets/2013/09/17/adobe-moves-into-hardware-its-proje- ct-mighty-cloud-pen-and-project-napoleon-digital-ruler-will-launch-in-2014- /.

"3DSIMO: The Amazing 3D Pen," Sep. 25, 2013, retrieved from www.popular3dprinters.com/3dsimo-the-amazing-3d-pen/.

(56) References Cited

OTHER PUBLICATIONS

"3D MakerPen—Handheld 3D Printer," Web page retrieved Sep. 27, 2013 from MakerGeeks.com, 2 pages.

"3Dsimo: First multi-material 3D drawing pen," Oct. 15, 2013, retrieved from www.3ders.org/articles/20131015-3dsimo-first-multi-material-3d-drawing-pe- n.html.

So, "Adobe's first hardware in the form of a 'cloud pen' and digital ruler," dated Nov. 1, 2013, retrieved from www.itbusiness.ca/news/adobes-first-hardware-comes-in-the-form-of-a-cloud- -pen-and-digital-ruler/44527.

Indiegogo campaign Web page, "3Dsimo—The Next Generation of 3D pens," (stating "campaign ended on Mar. 1, 2014"), retrieved on Apr. 15, 2015 from www.indiegogo.com/projects/3dsimo-the-next-generation-of-3d-pens—4.

"New OEM Model Leak!" Yaya Technology, Jan. 16, 2014, retrieved from www.yaya3dpen.com/?p=2939.

Webpage, RainSun 3D Pen Feb. 14, 2014, retrieved from www.abs-production.ru/articles/115123.

"Crowdsourcing Mornings: 3Dsimo—The Next Generation of 3D Pens," Feb. 24, 2014, retrieved from www.geekalabama.com/2014/02/24/crowdsourcing-mornings-3dsimo-the-next-gen- eration-of-3d-pens/.

"Lixpen, the smallest 3D printing pen," Mar. 28, 2014, retrieved from www.3ders.org/articles/20140328-lixpen-the-smallest-3d-printing-pen.html.

Webpage including image of Ahiro-002A, Apr. 4, 2014, retrieved from http://fm.homelan.lg.ua/?9=20675.

"Myriwell 3D Printing Pen Lets You Create 3D Models with Your Hand," May 19, 2014, retrieved from gadgetsin.com/myriwell-3d-printing-pen-lets-you-create-3d-models-with-you- r-hand.htm.

Ridden, "Cordless CreoPop pen makes 3D sketching cool," Jun. 5, 2014, retrieved from www.gizmag.com/creopop-3d-sketch-pen/32422/.

"CreoPop-Cool Ink. Infinite Creativity," Web page retrieved on Apr. 15, 2015 from www.indiegogo.com/projects/creopop-cool-ink-infi-nite-creativity.

"iMakr 3D Printing Pen Review", Jul. 28, 2014, retrieved from http://3dprinterplans.info/imakr-3d-printing-pen-review/.

"Polyes Q1 SLA-based 3D Printing Pen to Launch on Kickstarter in November," Sep. 30, 2014, retrieved from www.3dprint.com/17201/polyes-q1-3d-printing-pen/.

"RP400A 3D pen with OLED display," JER Education Technology Co Ltd, Oct. 21, 2014, retrieved from http://www.jereducation.com/yw/cpzx_show.asp?pid=266.

"Handheld Product Ergonomic Design," Human Engineering, Jun. 2011, vol. 17, No. 2, pp. 186-189.

* cited by examiner

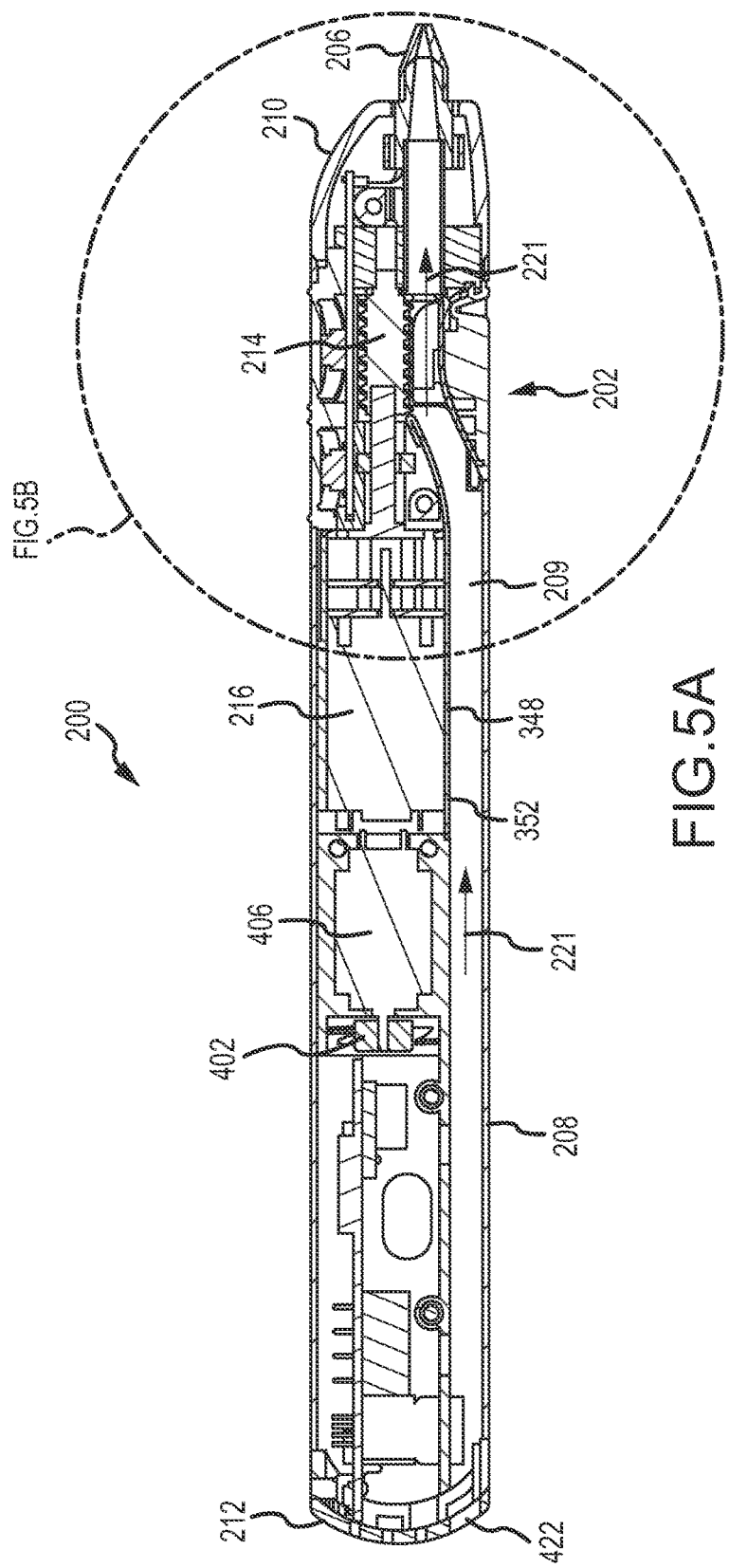

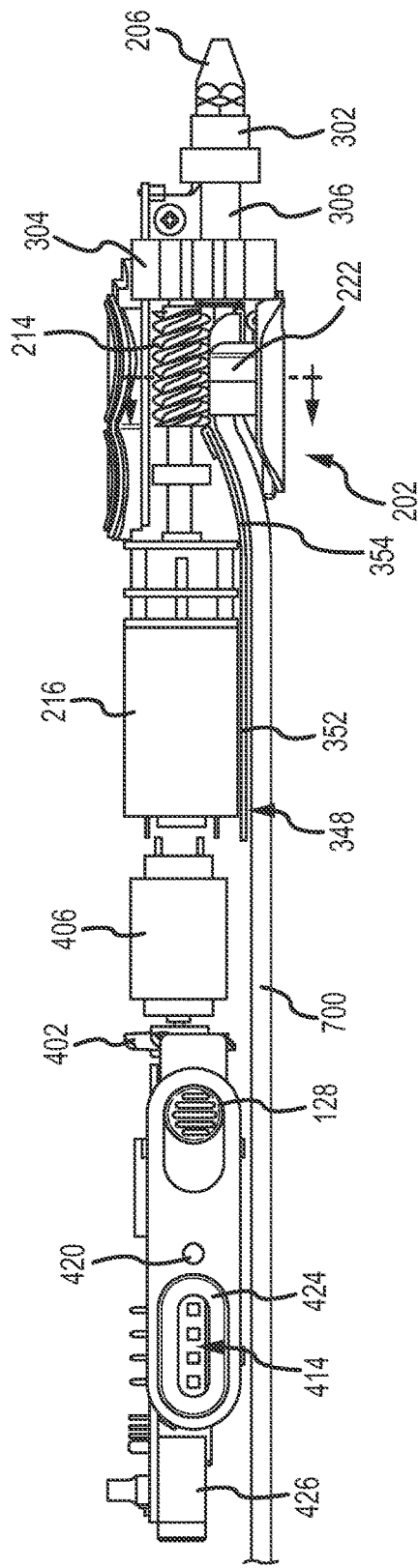
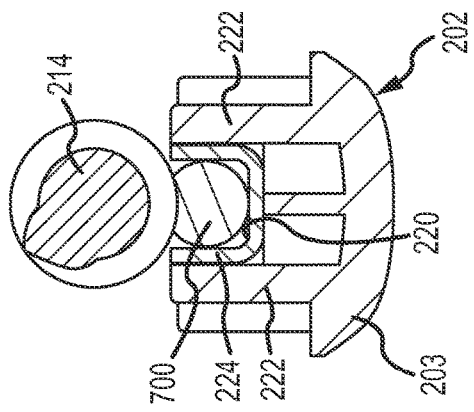
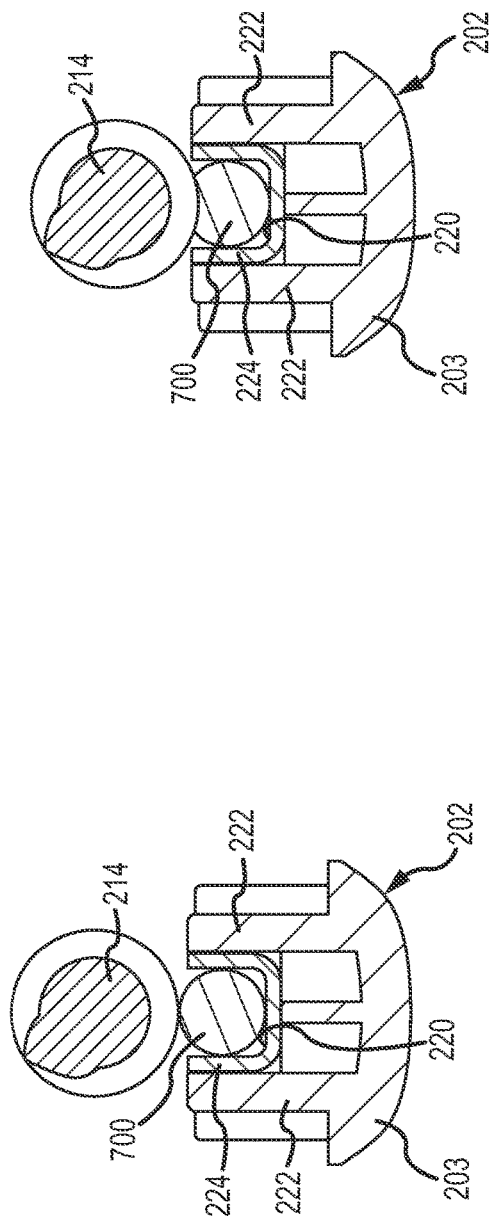

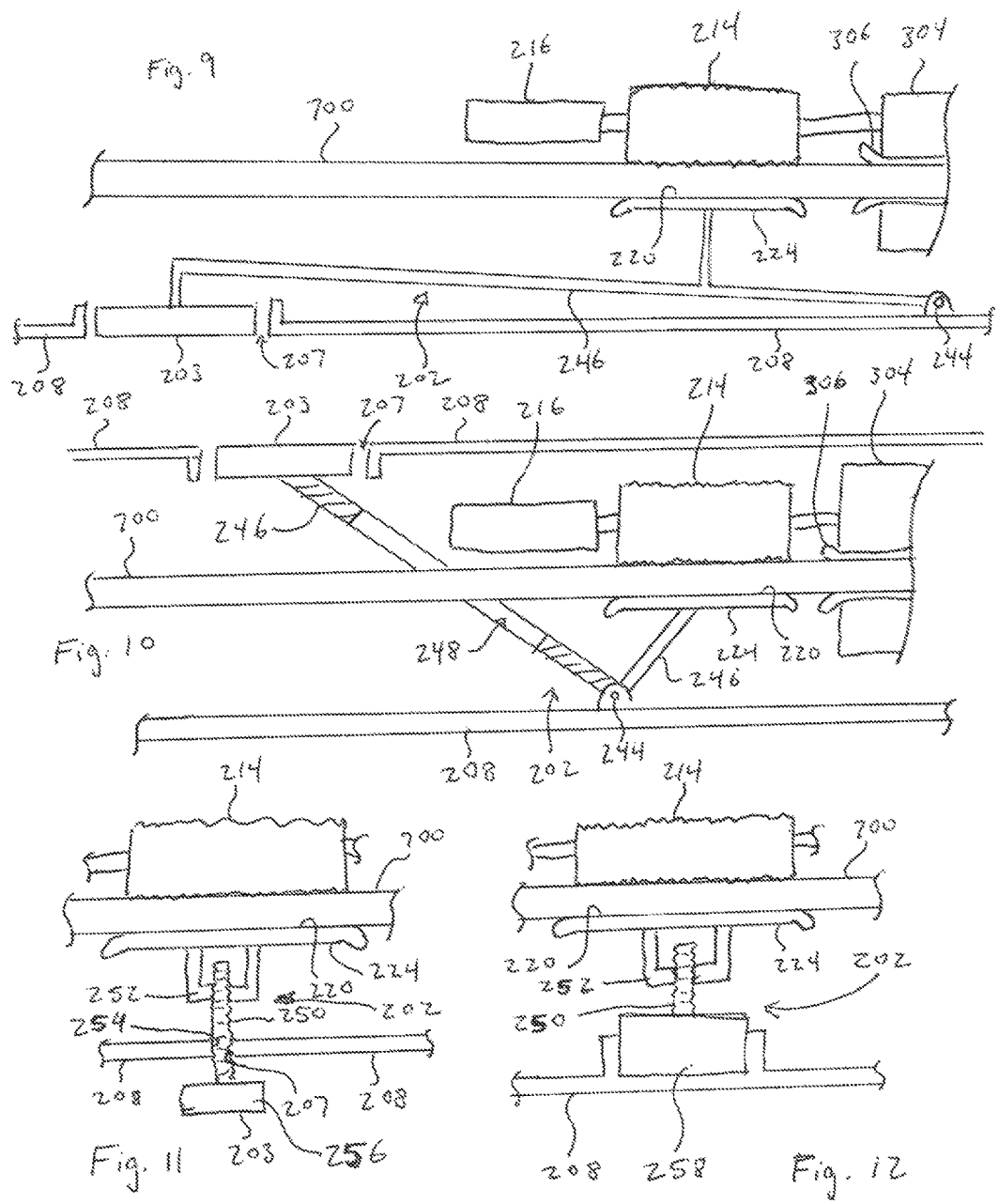

EXTRUSION DEVICE FOR THREE-DIMENSIONAL DRAWING

BACKGROUND

The present disclosure relates generally to extrusion devices and more particularly, in some aspects, to extrusion devices for three-dimensional drawing.

Three-dimensional ("3D") printers can be used to produce 3D items using extruded material. These printers tend to be large, expensive, and their operation requires a computer file, for example as generated by a Computer-Aided Design (CAD) program, which determines the item created. Handheld devices also can be used to create 3D items of extruded material.

SUMMARY

An aspect of some implementations of the subject technology involves improved control of handheld extrusion devices. Some implementations of the subject technology additionally or alternatively involve reduced energy consumption and/or improved management of heat generated by extrusion devices.

The subject technology is illustrated, for example, according to various aspects described below. Various examples of aspects of the subject technology are described as numbered clauses (1, 2, 3, etc.) for convenience. These are provided as examples and do not limit the subject technology. It is noted that any of the dependent clauses may be combined in any combination, and placed into a respective independent clause, e.g., clause 1, 9, or 12. The other clauses can be presented in a similar manner.

Clause 1. An extrusion device comprising:
  nozzle;
  a motor operatively coupled with a filament-engaging mechanism, the filament-engaging mechanism configured to urge a filament toward the nozzle when driven by the motor;
  a heater disposed between the filament-engaging mechanism and the nozzle such that the filament, when urged toward the nozzle by the filament-engaging mechanism, is moved into the heater, the heater configured to melt the filament; and
  a control member comprising a filament-engaging surface movable between a first position and a second position, at least a portion of the filament-engaging surface being closer to the filament-engaging mechanism in the second position than it is in the first position, the control member positioned such that (a) the filament-engaging surface faces the filament-engaging mechanism and (b) a path of filament movement extends between the filament-engaging surface and the filament-engaging mechanism.

Clause 2. The extrusion device of Clause 1, wherein the control member is configured for pivotal movement such that the at least a portion of the filament-engaging surface moves toward the filament-engaging mechanism when the control member is pivoted.

Clause 3. The extrusion device of Clause 2, wherein the control member comprises a first end and an opposing second end, one of the first end or the second end being moveable farther toward the filament-engaging mechanism than the other end.

Clause 4. The extrusion device of Clause 3, wherein the first end is moveable farther toward the filament-engaging mechanism than the second end, the first end being closer to the nozzle than is the second end.

Clause 5. The extrusion device of Clause 2, wherein at least a portion of the control member comprises a retaining feature, the retaining feature configured to removably couple with a portion of a support structure.

Clause 6. The extrusion device of Clause 1, wherein at least a portion of the filament-engaging surface comprises metal.

Clause 7. The extrusion device of Clause 6, wherein the control member comprises two or more components, and at least one of the components comprises metal.

Clause 8. The extrusion device of Clause 1, wherein the control member comprises walls extending from the filament-engaging surface toward the filament-engaging mechanism and along the path of filament movement.

Clause 9. An extrusion device comprising:
  a nozzle;
  a drive system configured to urge a filament toward the nozzle;
  an input mechanism; and
  a module configured to control operation of the drive system in response to operation of the input mechanism, the module configured to initiate, in response to actuation of the input mechanism two times within a defined period of time, a continuous flow mode in which the drive system to continuously urges the filament toward the nozzle.

Clause 10. The extrusion device of Clause 9, wherein the module is further configured to terminate the continuous flow mode in response to activation of the input mechanism when the continuous flow mode is active.

Clause 11. The extrusion device of Clause 9, wherein the module is further configured to stop the drive system from urging the filament toward the nozzle in response to actuation of the input mechanism while the continuous flow mode is active, and to resume the drive system urging the filament toward the nozzle when actuation of the input mechanism terminates.

Clause 12. An extrusion device comprising:
  a heat sink having a passage therethrough;
  a heater having a passage therethrough;
  a tube having a first portion coupled with the heat sink, and a second portion coupled with the heater such that the heat sink is spaced from the heater along the tube.

Clause 13. The extrusion device of Clause 12, wherein at least a portion of an inside surface of the tube comprises polytetrafluoroethylene (PTFE) or a material having a PTFE-based formula.

Clause 14. The extrusion device of Clause 13, wherein the tube comprises (a) metal and (b) PTFE or a material having a PTFE-based formula.

Clause 15. The extrusion device of Clause 13, wherein a length of the inside surface of the tube comprising PTFE is equal to or greater than a length of the passage of the heat sink, and extends from a first end of the tube toward a second end of the tube.

Clause 16. The extrusion device of Clause 12, wherein the extrusion pen melts and extrudes a filament using an input of 5 watts or less of electricity.

Clause 17. The extrusion device of Clause 12, wherein the heater comprises a heat capacitor and a heating element, and wherein at least a portion of the heat capacitor is disposed between the heating element and the tube.

Clause 18. The extrusion device of Clause 17, wherein the second portion is coupled with the heat capacitor.

Clause 19. The extrusion device of Clause 12, wherein the tube comprises a tube wall section, between the heater and heat sink, with a wall thickness of 0.2 mm or less.

Clause 20. The extrusion device of Clause 12, wherein the tube comprises a flared portion at a location opposite the second portion relative to the first portion, and that flares away from the first portion.

Clause 21. The extrusion device of Clause 12, wherein an exterior surface of the heat sink is coated with PTFE or a material having a PTFE-based formula, the coated exterior surface facing away from the heater toward a drive mechanism.

Clause 22. The extrusion device of Clause 12, further comprising a nozzle having interior threads, and wherein the heater comprises exterior threads.

Clause 23. The extrusion device of Clause 22, wherein the interior threads and the exterior threads are configured create a seal when engaged together.

Clause 24. The extrusion device of Clause 22, wherein the nozzle comprises a first frustoconical surface and the heated comprises a second frustoconical surface, the first and second frustoconical surfaces configured create a seal when engaged together.

Additional features and advantages of the subject technology will be set forth in the description below, and in part will be apparent from the description, or may be learned by practice of the subject technology. The advantages of the subject technology will be realized and attained by the structure particularly pointed out in the written description and claims hereof as well as the appended drawings.

It is to be understood that both the foregoing general description and the following detailed description are exemplary and explanatory and are intended to provide further explanation of the subject technology as claimed.

BRIEF DESCRIPTION OF THE DRAWINGS

The accompanying drawings, which are included to provide further understanding of the subject technology and are incorporated in and constitute a part of this description, illustrate aspects of the subject technology and, together with the specification, serve to explain principles of the subject technology.

FIG. 5A is a section view of the extrusion device of FIGS. 2A and 2B taken along line 5A-5A in FIG. 3.

FIG. 6A is a side view of a portion of the extrusion device of FIGS. 2A and 2B.

FIG. 6B is a section view, taken along the section line in FIG. 6A, of the extrusion device of FIGS. 2A and 2B, illustrating a control member in a first position.

FIG. 6C is a section view, similar to FIG. 6B, illustrating a control member in a second position.

FIGS. 9-12 are schematic partial cross-sectional views illustrating various control members according to aspects of the subject technology.

DETAILED DESCRIPTION

In the following detailed description, specific details are set forth to provide an understanding of the subject technology. It will be apparent, however, to one ordinarily skilled in the art that the subject technology may be practiced without some of these specific details. In other instances, well-known structures and techniques have not been shown in detail so as not to obscure the subject technology.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as "an aspect" may refer to one or more aspects and vice versa. A phrase such as "an embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such "an embodiment" may refer to one or more embodiments and vice versa. A phrase such as "a configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as "a configuration" may refer to one or more configurations and vice versa.

Figure 1:
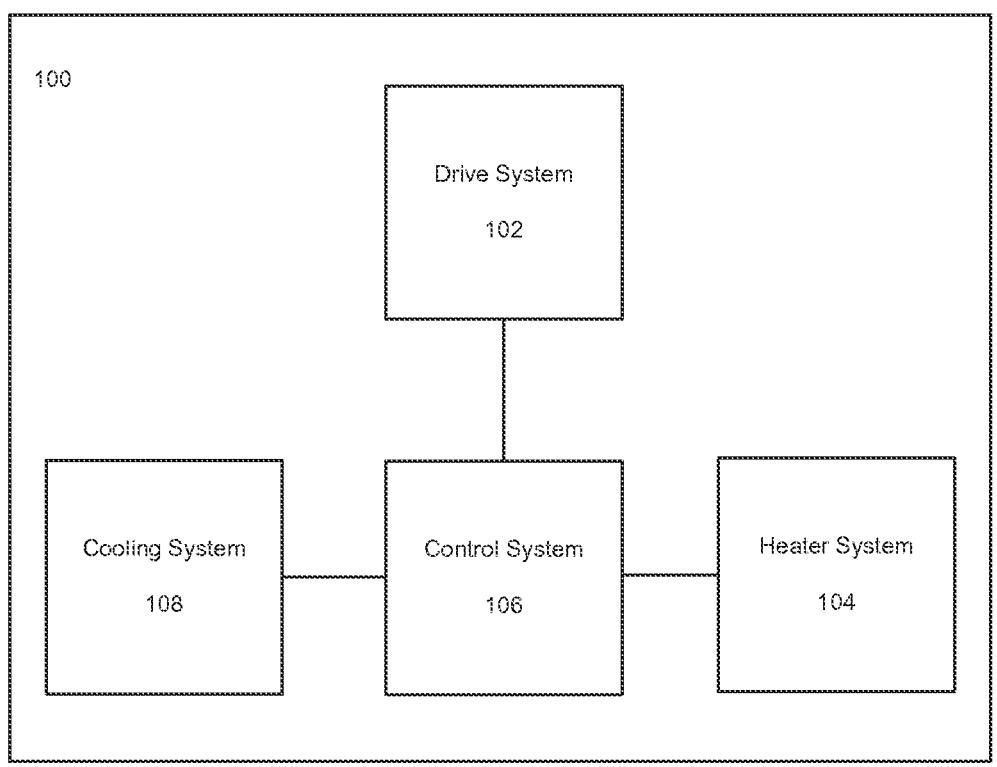
FIG. 1 is a schematic block diagram of an exemplifying extrusion device, illustrating various systems thereof, according the subject technology.

FIG. 1 is a schematic block diagram of an extrusion device 100 in accordance with various embodiments of the subject technology. The extrusion device can be operable for 3D drawing by a user supporting the device with a single hand. The extrusion device can be configured in the form of a pen. The system 100 illustrated in FIG. 1 includes a drive system 102, a heater system 104, and a control system 106. In some embodiments, such as that illustrated in FIG. 1, the system 100 can include a cooling system 108. The drive system 102 urges a filament toward the heater system 104. The heater system 104 is configured to melt a filament, and direct the melted material of the filament to an outlet. The control system 106 controls operation of the drive system 102, the heater system 104, the cooling system 108, or any combination thereof in response to operation of an input mechanism.

Figure 2A:
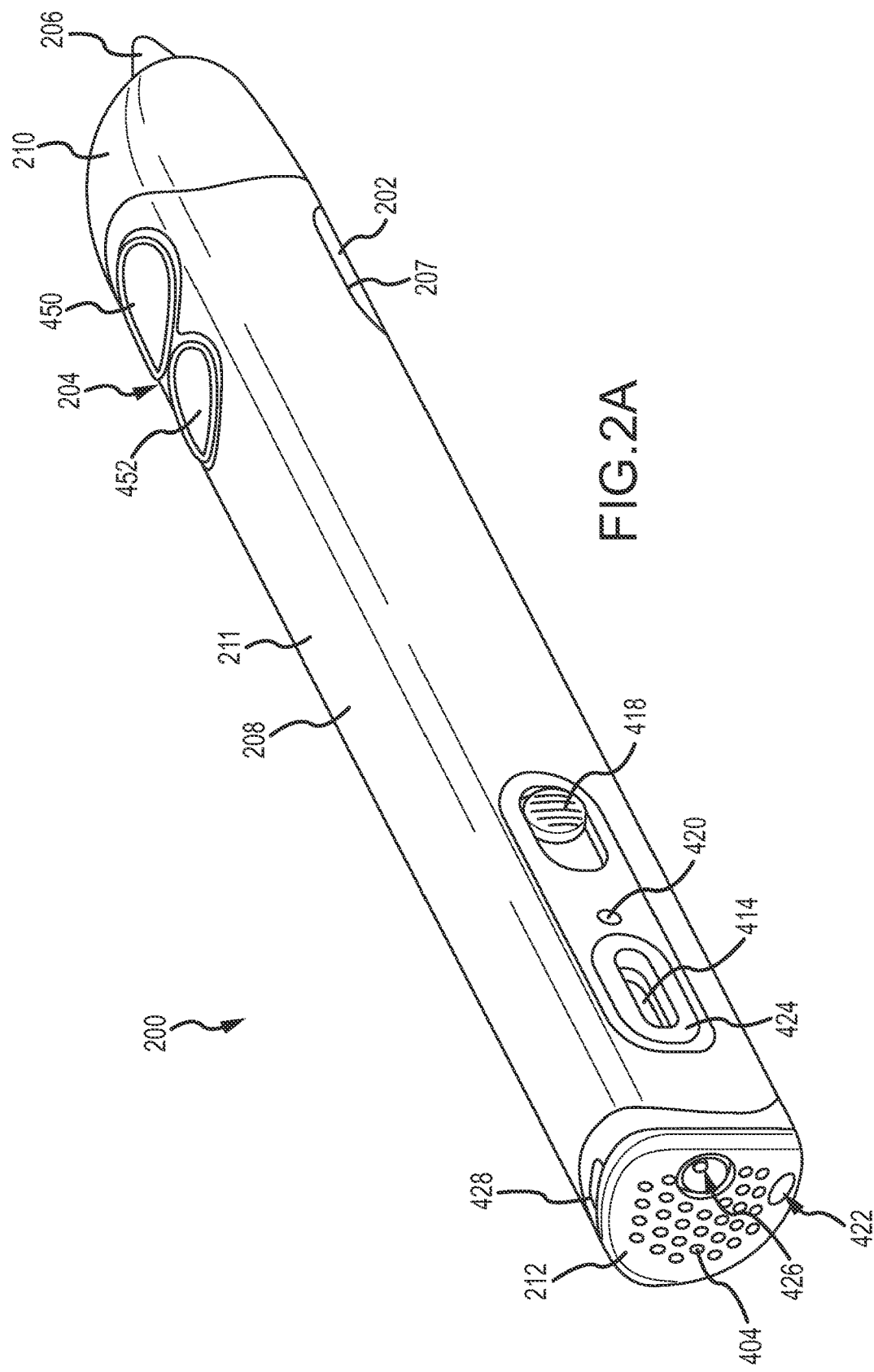
FIG. 2A is a rear perspective view of an extrusion device in accordance with aspects of the present disclosure.
Figure 2B:
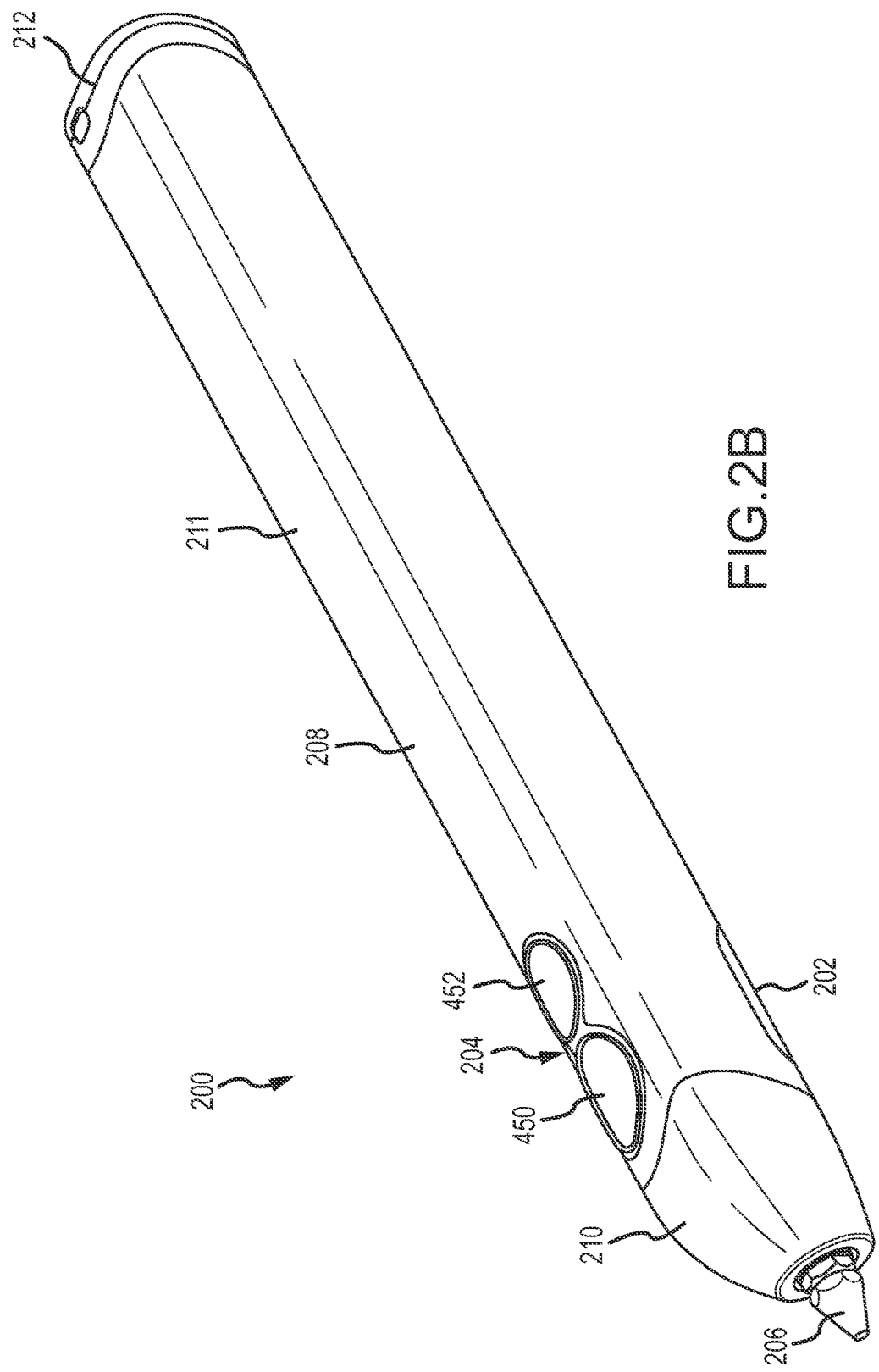
FIG. 2B is a front perspective view of the extrusion device of FIG. 2A.
Figure 3:
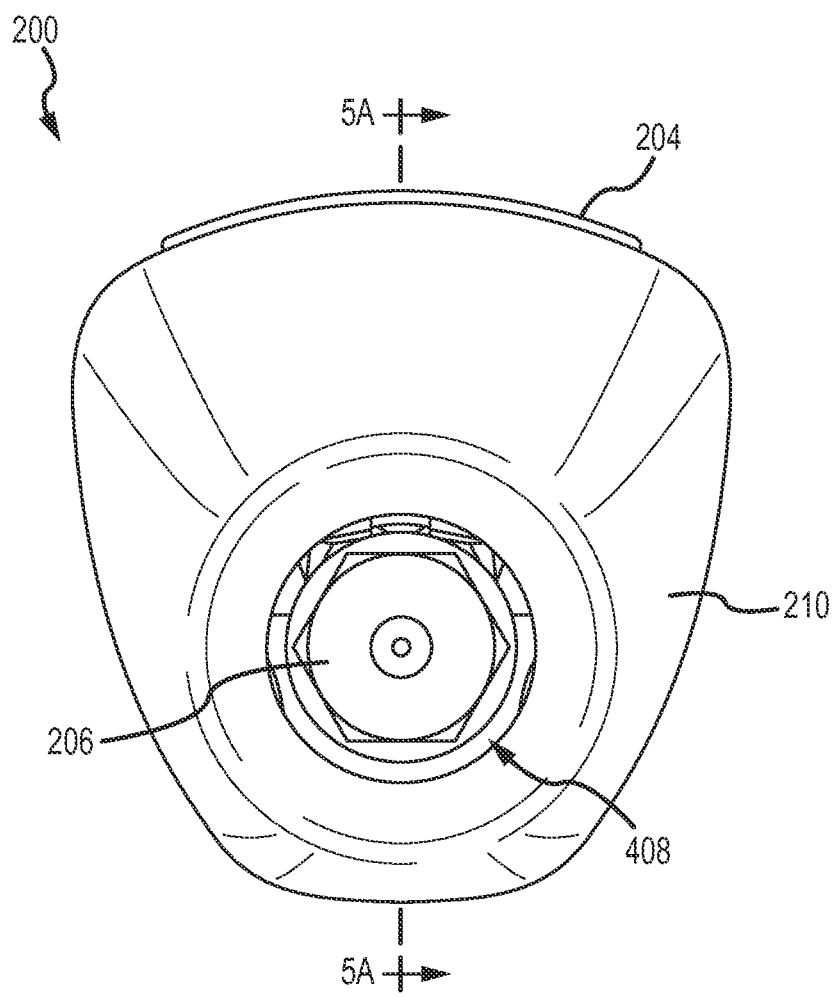
FIG. 3 is a front view of the extrusion device of FIGS. 2A and 2B.

FIGS. 2A-3 illustrate an exemplifying extrusion device 200 for 3D drawing by a user supporting the device with a single hand. The extrusion device 200 can shaped as a pen, for example as illustrated in FIGS. 2A-3, that can be held in a hand of a user and manipulated to extrude a melted filament and arrange the extruded material of the melted filament free-hand in a three dimensions. The extrusion device of FIGS. 2A and 2B includes a control member 202, an input mechanism 204, and an outlet 206. The extrusion device 200 can include a housing 208 in some embodiments. The housing can have a front cover 210, a middle cover 211, and a rear cover 212. Although the housing 208 illustrated in FIGS. 2A and 2B comprises a housing including three components, the housing 208, if included, can be formed of other numbers of components, such as a single component or any numbers of multiple components.

Figure 4A:
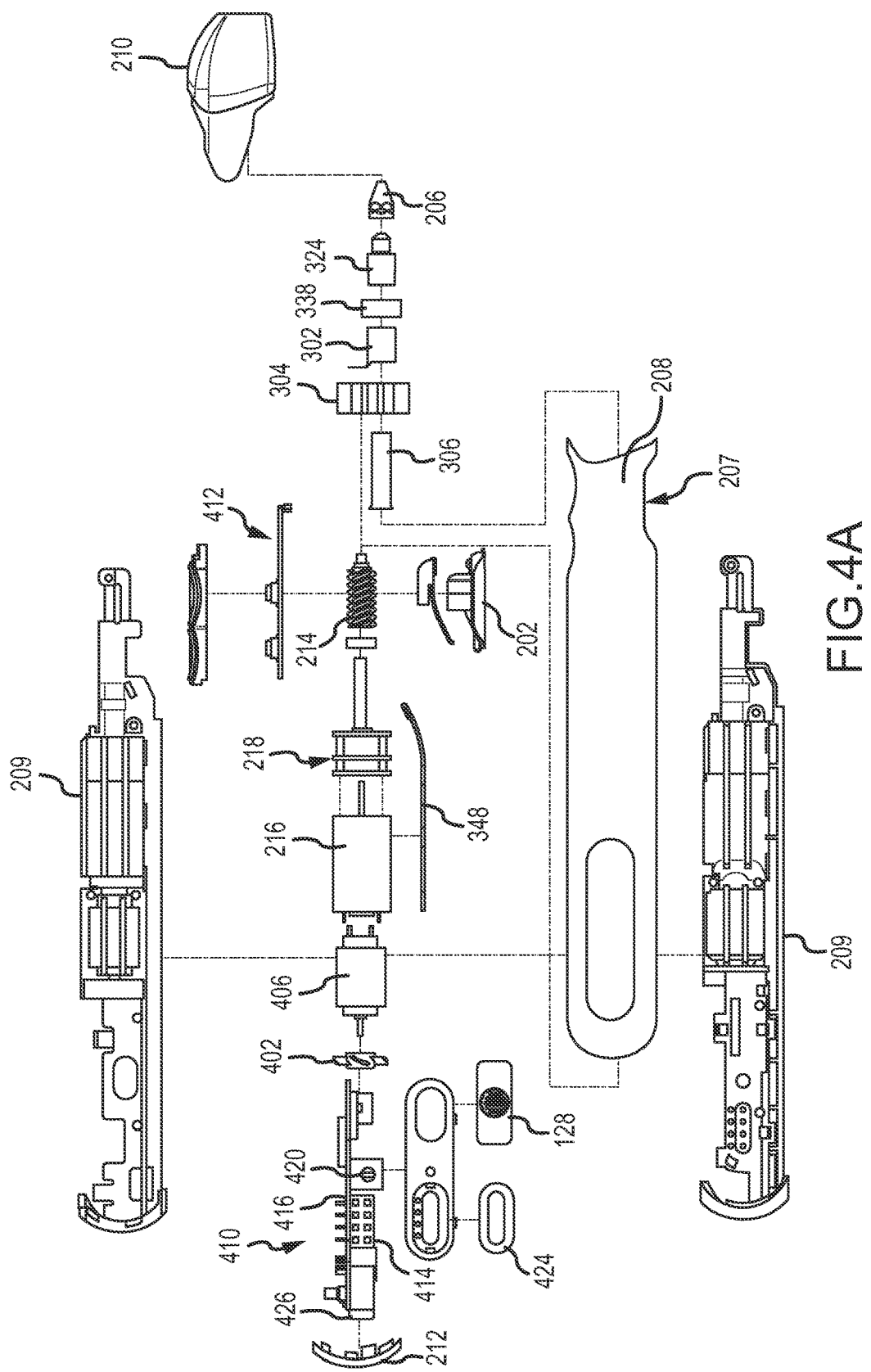
FIG. 4A is an exploded side view of the extrusion device of FIGS. 2A and 2B.
Figure 4B:
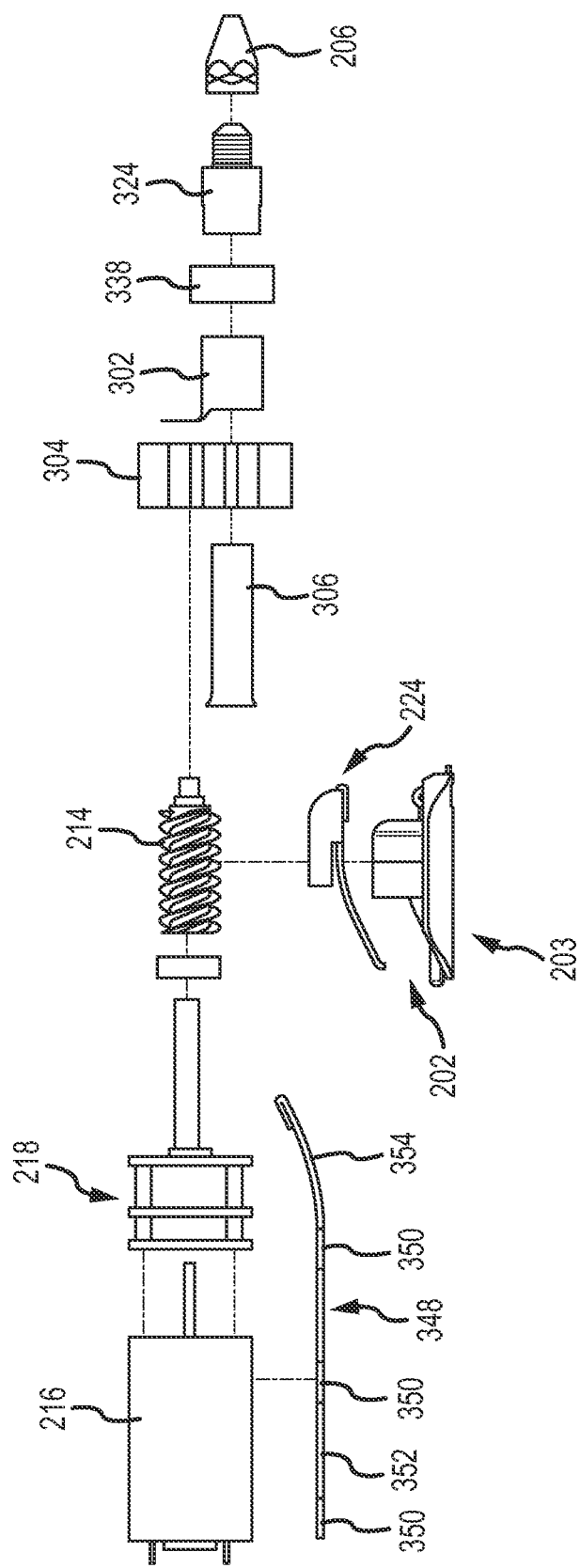
FIG. 4B is an enlarged view of a portion of the exploded view of FIG. 4A.

FIGS. 4A and 4B are exploded side views of the extrusion device 200 of FIGS. 2A-3. As illustrated in FIGS. 4A and 4B, the drive system 102 can comprise, for example, a filament-engaging mechanism 214 and a motor 216. The filament-engaging mechanism 214 illustrated in FIGS. 4A and 4B comprises a threaded component, such as worm gear for example, having threads along an outer surface. The threads extend laterally outward from an axis of rotation of the filament-engaging mechanism 214. The filament-engaging mechanism 214 can comprise a single piece or a plurality of pieces. In some embodiments, the filament-engaging mechanism 214 can comprise a spur gear, a ring gear, a gear-shaped piece, or a disk with teeth. In some embodiments, the threads extend helically around and along a shaft the filament-engaging mechanism 214, as illustrated for example in FIGS. 4A, 4B, 6A, 6B, and 6C. In some embodiments, the screw can comprise one or a plurality of threads, e.g., one, two, or three, extending helically around a circumference of the shaft.

The filament-engaging mechanism 214 engages with and, when driven by the motor 216, urges a filament toward the outlet 206. The threads engage and partially embed into the filament to grip the filament while urging it toward the outlet 206. In some embodiments, the motor 216 can drive the filament-engaging mechanism 214 in multiple directions, e.g., clockwise and counterclockwise. Depending on the direction the filament-engaging mechanism 214 is driven, the filament-engaging mechanism urges the filament toward or away from the outlet 206. An axis of rotation of the filament-engaging mechanism 214 can be parallel to a longitudinal axis of a portion of the filament contacted by the filament-engaging mechanism, for example as in the illustrated embodiment. In some embodiments, the axis of rotation of the filament-engaging mechanism 214 and the longitudinal axis of a portion of the filament contacted by the filament-engaging mechanism can be arranged transversely, e.g., orthogonally or perpendicularly relative to each other.

The filament-engaging mechanism 214 can be made of metal, plastic, ceramic, or other material(s) or combinations thereof. A portion of the filament-engaging mechanism 214 can include a heat-insulating coating. In some embodiments, the heat-insulating coating comprises polytetrafluoroethylene (PTFE) or a material having a PTFE-based formula, such as, for example, Teflon®. The heat-insulating coating, if present, can be limited to the threads, the portion of the filament-engaging mechanism 214 between the threads, or the entire outer surface of the filament-engaging mechanism 214. In some embodiments, a passage through the filament-engaging mechanism 214 can be covered, partially or completely, with a heat-insulating coating.

Figure 5B:
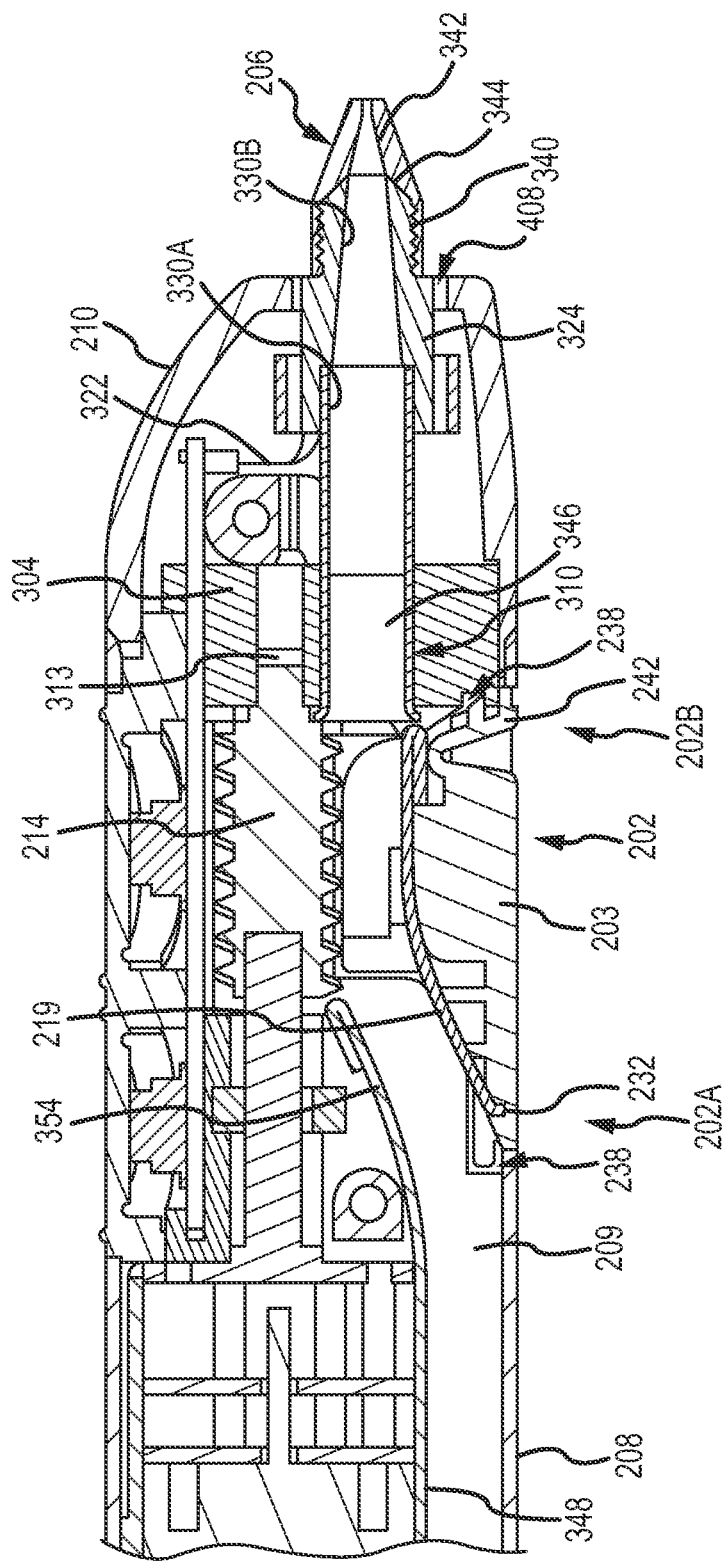
FIG. 5B is an enlarged view of a portion of FIG. 5A.

As shown, for example, in FIGS. 5A and 5B, the filament-engaging mechanism 214 is operatively coupled with a motor 216. The filament-engaging mechanism 214 can be operatively coupled to a motor 2016 directly or through a power transmission system 218. The power transmission system 218 can comprises a single component or a plurality of components. In some embodiments, the power transmission system 218 includes a single gear or a gear train. In some embodiments, the motor 216 and filament-engaging mechanism 214 rotate together at a 1:1 ratio. In some embodiments, the power transmission system 218 provides a mechanical advantage to the filament-engaging mechanism 214.

As shown, for example, in FIGS. 5A and 5B, the control member 202 can be positioned such that the filament extends between the filament-engaging mechanism 214 and the control member 202. The control member 202 comprises a filament-engaging surface 220 facing the filament-engaging mechanism 214. The control member 202 can comprise a ramp portion 219, for example as shown in FIG. 5B, that directs the filament toward the filament-engaging mechanism 214. The control member 202 comprises a first end 202A and an opposing second end 202B. The control member 202 can be oriented such that the second end 202B is closer to the outlet 206 than is the first end 202A. The ramp portion 219 can form a portion of the filament-engaging surface 220. The ramp portion can be positioned closer to the first end 202A than to the second end. The control member 202 is positioned such that at least a portion of the filament-engaging surface 220 opposes the filament-engaging mechanism 214 with an area between the filament-engaging surface 220 and the filament-engaging mechanism 214 forming a portion of a filament pathway 221 (see FIG. 5A).

The control member 202 is moveable between a first position and a second position. At least a portion of the filament-engaging surface 220 is closer to the filament-engaging mechanism 214 in the second position than it is in the first position. The control member can be positioned such that (a) the filament-engaging surface 220 faces the filament-engaging mechanism 214 and (b) a path of filament movement 221 extends between the filament-engaging surface and the filament-engaging mechanism. The control member 202 can be aligned with the filament-engaging mechanism 214 such that a force applied to the control member 202 is transmitted to a filament 700 and urges the filament against the filament-engaging mechanism.

When the control member 202 is in the first position, for example as shown in FIG. 6B, the distance between the filament-engaging mechanism 214 and the filament-engaging surface 220 admits the filament 700 between the filament-engaging mechanism 214 and the filament-engaging surface 220 and permits movement of the filament 700 while the filament is engaged by the filament-engaging mechanism 214 and the filament-engaging surface 220. When the control member 202 is moved toward the filament-engaging mechanism 214 to the second position, for example as shown in FIG. 6C, the distance between the filament-engaging surface 220 and filament-engaging mechanisms 214 is reduced. In the second position, a greater force is applied by the control member to the filament 700 in a direction of the filament-engaging mechanism 214 than is applied when in the first position. The additional force transmitted by the filament against the filament-engaging mechanism 214 causes the filament to be urged toward the outlet 206 at a faster rate than when the control member 202 is in the first position. Although the filament-engaging surface 220 is illustrated as comprising a centrally-located flat surface, the centrally-located portion of the filament-engaging surface 220 can have other configurations, such as having an arced shape or V-shape as viewed in the cross-sectional views of FIGS. 6A and 6B.

Figure 7:
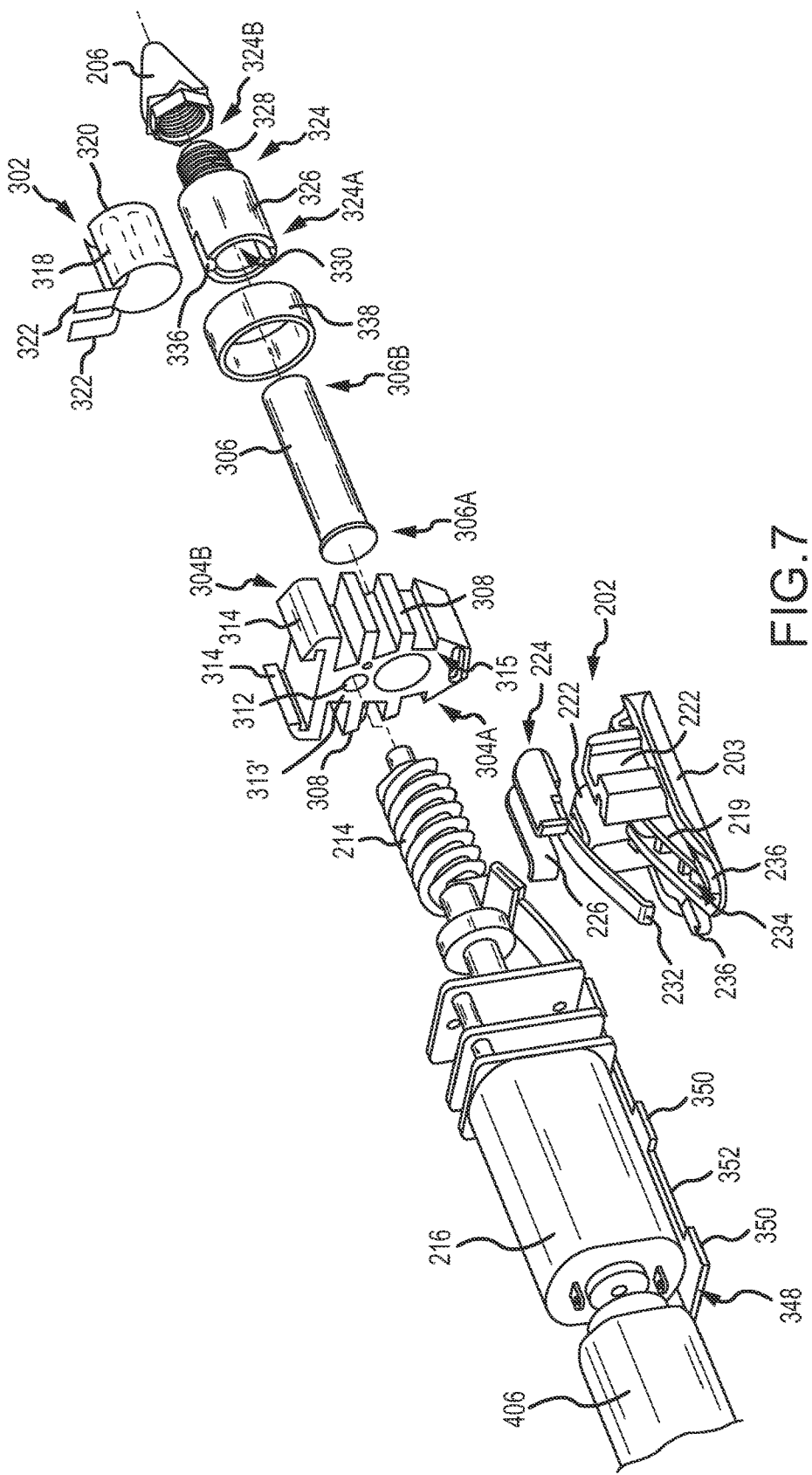
FIG. 7 is an exploded, rear perspective view of the extrusion device of FIGS. 2A and 2B.

As illustrated for example in FIGS. 6A-6C, the control member 202 can comprise a pair of walls 222 that extend on opposing sides of the filament-engaging surface 220 toward the filament-engaging mechanism 214 such that the filament-engaging surface 220 is between opposing, inwardly-facing surfaces of the walls 222. The opposing, inwardly-facing surfaces of the walls 222 illustrated in FIGS. 6B, 6C, and 7 are parallel and are separated by a space, between an inside surface of each wall 222, that accommodates the filament 700 and permits the filament to be urged by the filament-engaging mechanism 214 along the longitudinal axis of the filament toward or away from the outlet 206. Although the inwardly-facing surfaces of the walls 222 are illustrated as being parallel, the inwardly-facing surfaces can be arranged such that they are not parallel in some embodiments. For example, the inwardly-facing surfaces of the walls 222 can be closer together at their ends closer to the outlet 206 than they are to each other at their ends farther from the outlet 206. Additionally or alternatively, they can be inclined such that they are farther apart (e.g., forming a V-shape) or closer together as they approach the filament-engaging mechanism 214. In some embodiments, the control member 202 is shaped as a saddle, a channel, a hyperbolic paraboloid, or a surface having a groove between the first end 202A and the second end 202B.

Figure 8A:
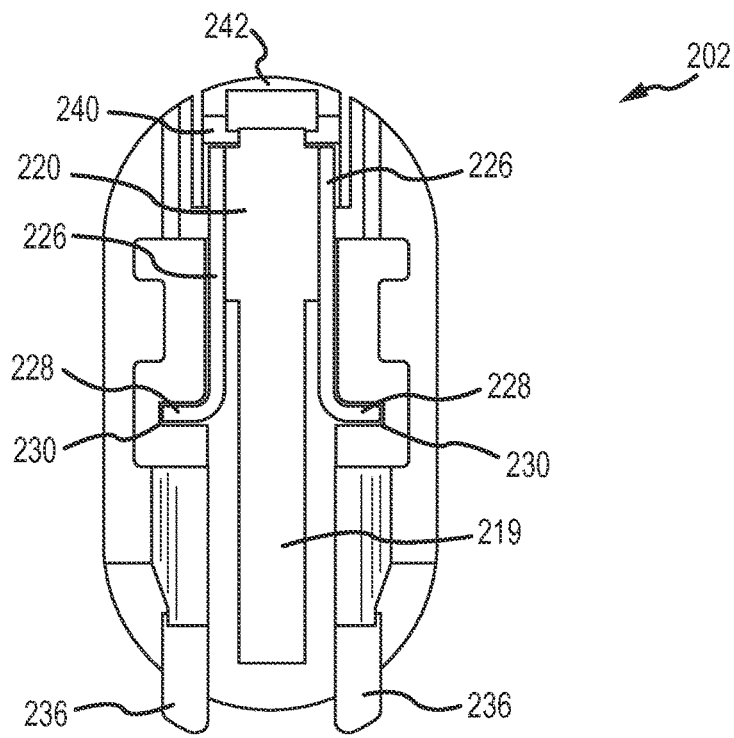
FIG. 8A is a top view of a control member of the extrusion device of FIGS. 2A and 2B, also shown in FIG. 7.
Figure 8B:
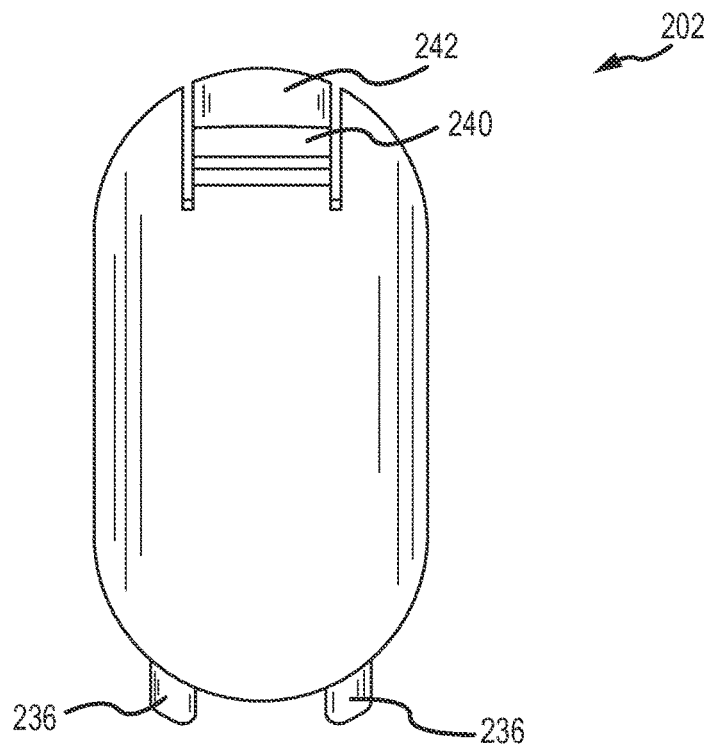
FIG. 8B is a bottom view of the control member of FIG. 8A.

As shown for example in FIGS. 7-8B, the control member 202 can comprise a guide 224, disposed between the first end 202A and the second end 202B, and between the inwardly-facing surfaces of the walls 222. The guide 224 can comprise all or a part of the filament-engaging surface 220. A pair of guide walls 226 extends toward the filament-engaging mechanism 214. Although the guide walls 226 are illustrated as being parallel and extending perpendicularly to the centrally-located portion of the filament-engaging surface 220, the guide walls 226, which may form part of the filament-engaging surface 220, can be arranged such that they are not parallel in some embodiments. For example, the guide walls 226 can be closer together at their ends closer to the outlet 206 than they are to each other at their ends farther from the outlet 206. Additionally or alternatively, they can be inclined such that they are farther apart (e.g., forming a V-shape) or closer together as they approach the filament-engaging mechanism 214. In some embodiments wherein the guide walls are shaped to be farther apart as they approach the filament-engaging mechanism 214, the guide walls 226 can intersect and a middle portion of the filament-engaging mechanism 214, between the guide walls can be omitted. Each guide wall 226 can extends parallel with a corresponding inwardly-facing surface of a corresponding wall 222. A portion of each guide wall 226 can comprise a wing 228. The wing 228 can be located at an end of the guide wall 226. The wings 228 extend away from each other. The wings 228 can be inserted into grooves 230 in the walls 222 to maintain alignment, positioning, and/or coupling of the guide 224 with the walls 222.

In some embodiments, the support structure can comprise guide walls, similar to the guide walls 222 of the control member 202, but separate from the control member. In some embodiments, the support structure can comprise a tube arranged to guide the filament from the aperture 422 to the heater system 104. Such a tube can be in addition to or in place of the tube 306. Such tube can comprise guide walls that, similar to the guide walls 222, inhibit lateral movement of the filament relative to the filament pathway 221 in a direction that inhibits movement of the filament laterally away from the filament-engaging mechanism 214.

As shown, for example, in FIGS. 2A, 2B, 5A and 5B, the control member 202 can be positioned such that a user, supporting the device in a single hand, can access and manipulate the control member 202, e.g., by using one or more fingers. In some embodiments, the control member 202 can be disposed in an opening 207 through the housing 208, as shown for example in FIGS. 5A and 5B. In some embodiments, the control member 202 can be disposed between the filament path 221 and an exterior of the extrusion device 200.

In some embodiments, the control member 202 comprises one or more retaining features 236, 242, for example as shown in FIGS. 5A, 5B, and 7-8B, configured to engage a support structure of the extrusion device 200. In some embodiments, the support structure includes the housing 208, the frame 209, or both. A retaining feature 236 at the first end 202A of the control member 202 cooperates with the support structure to retain the control member 202 and permit (a) the first end 202A or the second end 202B to translate in a limited manner in a direction toward and away from the filament-engaging mechanism 214, (b) the control member to pivot, about an axis, e.g., an axis proximate the first end 202A or the second end 202B, or (c) both (a) and (b).

In some embodiments, the retaining feature(s) 236, 242 couple(s) to the support structure by protruding into a respective space 238, e.g., a pocket, recess, groove or cavity. The space 238 can be formed in the housing 208, the frame 209, or both. The space 238 can be formed between the housing 208 and frame 209, for example as illustrated in FIG. 5B. In some embodiments, some or all of the retaining feature(s) 236, 242 of the control member 202 can comprise a space, e.g., a pocket, recess, groove or cavity, in a body 203 of the control member 202, and a portion of the support structure (the housing, frame, or combination thereof) extends into the retaining feature. In some embodiments, the control member can be attached to the support structure by a hinge, which may be a living hinge, and the retaining feature 236, 242 can comprise a portion configured for hinged attachment to the support structure.

In some embodiments, the control member 202 comprises a releasable retaining feature at the first end 202A or the second end 202B. The control member illustrated in FIGS. 5A-8B has a releasable retaining feature 242 at the second end 202B, which is closer to the outlet 206 than is the first end 202A. The releasable retaining feature can be configured in a variety of manners. The releasable retaining feature 242 comprises an arched portion 240 that biases an end portion of the retaining feature 242 away from the body 203 of the control element 202. The retaining feature 242 illustrated in in FIGS. 5A and 5B as cooperating with a heat sink 304, which forms a part of the support structure, to retain the control member 202. The retaining feature 242 can restrain at the second end 202B the distance that the control member is permitted to pivot about the retaining feature 236 at the first end 202A toward or away from the filament-engaging mechanism 214. In some embodiments, the retaining feature 236 can restrain at the first end 202A the distance that the control member is permitted to pivot about the retaining feature 242 at the second end 202B toward or away from the filament-engaging mechanism 214.

The guide 224 can comprise a portion 232 that mates within a notch 234 in the body 203 at the first end 202A of the control member 202. At or near the opposing end of the guide 224, another portion of the guide can be curved away from the filament-engaging mechanism 214 to provide a rounded terminus to the filament-engaging surface 220. The rounded terminus and the portion 232 can provide a smooth surface for sliding contact with the filament. In an embodiment, the guide 224 comprises metal and body 203 of the control member 202 comprises plastic. The control member 202 can comprise a single monolithic component or a plurality of components. In embodiments wherein the control member 202 comprises a single monolithic component, the single monolithic component can comprise any of the herein-disclosed features of the guide 224.

FIGS. 6B and 6C illustrate first and second positions, respectively, of the control member 202 relative to the support structure and the filament-engaging mechanism 214. FIG. 6A illustrates the filament 700 positioned between the filament-engaging mechanism 214 and the control member 202, and the control member coupled with the support structure by the retaining features 236, 242. FIG. 6B illustrates the control member 202 in a position closer to the filament-engaging mechanism 214 that it is in FIG. 6A. The control member 202 can be moved from the first position to the second position by pivoting about the retaining feature 236 at the first end 202A toward the filament-engaging mechanism 214 while the retaining feature 242 at the second end 202B permits movement of the control member 202 toward the filament-engaging mechanism 214 and restricts the distance of travel. In some embodiments, the control member 202 can be moved from the first position to the second position by pivoting about the retaining feature 242 at the second end 202B toward the filament-engaging mechanism 214 while the retaining feature 236 at the first end 202A permits movement of the control member 202 toward the filament-engaging mechanism 214 and restricts the distance of travel. In some embodiments, the retaining features 236, 242 permits both the first end 202A and the second end 202B to move toward the filament-engaging mechanism 214 and restricts the distance of travel or their respective ends of the control member.

FIGS. 9-12 are schematic partial cross-sectional views illustrating various control members according to aspects of the subject technology. The extrusion devices comprising the control members of FIGS. 9-12 can be similar to the extrusion devices disclosed herein. Therefore, not all components of the extrusion devices are illustrated in FIGS. 9-12.

FIG. 9 illustrates a control member 202 having (a) a pivot location 244 is disposed closer to a front end of the extrusion device, and the outlet (FIG. 6A), than is the filament-engaging surface 220, and (b) a body 203 disposed closer to a rear end of the extrusion device, and the aperture 422 (FIG. 5A), than is the filament-engaging surface 220. The body 203 can be accessible through an opening 207 through the housing 208 on the same lateral side of the device as is disposed the pivot location 244. The separation of the body 203 from each of the pivot location 244 and filament-engaging surface 220 can provide mechanical advantage for application of pressure to the filament 700 urging it against the filament-engaging mechanism 214. A guide 224 can comprise the filament-engaging surface 220. The filament-engaging surface 220, the body 203, or both can be attached to a lever 246 extending from the pivot location 244 to the body 203. In some embodiments, the lever can be integrally formed as a single component with the body, the guide, or both. The lever can be attached to the support structure, e.g., the housing 208 or the frame 209, at the pivot location by a hinge, as illustrated in FIG. 9 for example, or by retaining features such as retaining features 236, 242 disclosed herein. The pivot location 244 can be separated from the body 203 by a distance greater than a length of the filament-engaging surface 220. A distance between the pivot location 244 and the body 203 can be greater than a distance between the pivot and the filament-engaging surface 220.

FIG. 10 illustrates a control member 202 having a pivot location 244 is disposed between the filament-engaging surface 220, and a body 203. The body 203 can be disposed closer to a rear end of the extrusion device, and the aperture 422 (FIG. 5A), than is the filament-engaging surface 220. The body 203 can be accessible through an opening 207 through the housing 208 on a lateral side of the device opposing a lateral side where the pivot location 244 is disposed. The separation of the body 203 from each of the pivot location 244 and filament-engaging surface 220 can provide mechanical advantage for application of pressure to the filament 700 urging it against the filament-engaging mechanism 214. A guide 224 can comprise the filament-engaging surface 220. The filament-engaging surface 220, the body 203, or both can be attached to a lever 246 extending from the guide 223 to the pivot location 244 and the body 203. In some embodiments, the lever can be integrally formed as a single component with the body, the guide, or both. The lever can be attached to the support structure, e.g., the housing 208 or the frame 209, at the pivot location by a hinge, as illustrated in FIG. 10 for example, or by retaining features such as retaining features 236, 242 disclosed herein. A distance between the pivot location 244 and the body 203 can be greater than a distance between the pivot and the filament-engaging surface 220. The lever 246 can have a passage 248 therethrough to allow the filament to extend through the passage 248 and the control member 202 to be operated without interfering with the filament 700.

In some embodiments, the pivot location 244 can be disposed closer to a front end of the extrusion device, and the outlet (FIG. 6A), than is the filament-engaging surface 220, as illustrated for example in FIG. 9, and the body 203 can be accessible through an opening 207 through the housing 208 on a lateral side of the device opposing a lateral side where the pivot location 244 is disposed, as illustrated for example in FIG. 10.

Each of FIGS. 11 and 12 illustrates a control members 202 moved toward and away from a filament-engaging mechanism 214 by rotation of a threaded post 250. The threaded post 250 cooperates with a complementary threaded portion 252 of the guide 224. Rotation of the threaded post 250 relative to the threaded portion 252 moves at least a portion of the filament-engaging surface 220 toward and away from the filament-engaging mechanism 214.

In some embodiments, the threaded post 250 can extend through a threaded opening 254 through the housing 208, as illustrated for example in FIG. 11, such the threaded post 252 can be manipulated, e.g., rotated, by a user from a location exterior to the housing 208. The threaded post 252 can be fixedly attached to a knob 256 to facilitate manipulation, e.g., rotation, of the threaded post 252 by the user.

In some embodiments, the threaded post 250 can be contained completely within the housing 208, as illustrated for example in FIG. 12. The threaded post 252 can be manipulated, e.g., rotated, by motor 258 in response to operation of an input mechanism by a user. Such an input mechanism can be similar to the input mechanism 204, and can comprise one or more buttons accessible from the exterior to the housing 208. The threaded post 252 can be attached to or the motor 258 such that rotation of the motor causes a corresponding rotation of the threaded post 252, which may be a direct 1:1 correspondence or provide a mechanical advantage through intermediate gearing (not shown).

As illustrated for example in FIGS. 5A and 5B, the extrusion device 200 can comprise a frame 209 and a housing 208 disposed around the frame. The housing 208 can include opening at opposing ends. The housing 208 comprises a front cover 210 disposed at a front end, a rear cover 212 disposed at a rear end, and a middle cover 211 between the front and rear covers. The rear cover 212 has an aperture 422 through which the filament 700 can be inserted into the extrusion device 200. A filament pathway 221 extends within the extrusion device 200. The filament pathway can be defined in part by the housing 208, the frame 209, or a combination thereof. The filament pathway 221 extends from the aperture 422 to the outlet 206. A routing rail 348 can extend along a portion of the filament pathway between the aperture 422 and the filament-engaging mechanism 214.

In some embodiments, the routing rail 348 comprises an elongated surface having a flat portion 352 and a slope portion 354, shown for example in FIG. 6A. Prongs 350 protrude laterally from a centerline extending along a length of the routing rail 348. The prong 350 mate to openings in the frame 209. The flat portion 352 can be disposed, as illustrated for example in FIG. 5A, along the filament pathway, opposite to the housing 208. The slope portion 354 can be disposed along the filament pathway, opposing to the ramp portion 219 of the control member 202. The routing rail 348 transitions from the flat portion 352 to the slope portion 354 at a location the same distance as or farther from the outlet 206 than is the first end of the control number 202. The slope portion 354 can be aligned with the ramp portion 219 to form a portion of the filament pathway 221 therebetween. A portion end of the routing rail 348 adjacent to the filament-engaging mechanism 214 can be curved away from the filament pathway and back upon itself. The flat portion 352 of the routing rail 348 can extend along a portion of the filament pathway from a location proximate the first end 202A of the control member 202 toward the aperture 422. In various embodiments in which the routing rail 348 is employed, the flat portion 352, if present, can extend from a location near the filament-engaging mechanism 214 to the fan motor 406, the aperture 422, or locations therebetween.

As the filament moves from the aperture 422 toward the outlet 206 when inserted into the aperture, the filament enters the portion of the pathway between the slope portion 354 of the routing rail 348 and the ramp portion 219 of the control member 202. The ramp portion 219 of the control member 202 directs the filament toward and into engagement with the filament-engaging mechanism 214. Further movement of the filament toward the outlet 206, whether pushed by a user, pulled by the filament-engaging mechanism 214, or both, positions the filament between the filament-engaging mechanism 214 and the filament-engaging surface 220 of the control member 202.

The filament 700 is urged by the filament-engaging mechanism 214 into the heater system 104. In some embodiments, the heater system 104 can be configured such that the heater system is powered by 5 Watts or less of electricity. In some embodiments, the heater system operates with an electrical input at 5 volts and 1 amp. In some embodiments, the heater system 104 can be configured such that the extrusion device 200, including the heater system, is powered by 6 Watts or less of electricity. In some embodiments, the extrusion device 200 operates with an electrical input at 5 volts and 1.2 amps. In some embodiments, the extrusion device 200 can be powered by a USB port. In some embodiments, a switch 418 can be operated to change a heater control algorithm between preset modes operating with different power consumption of filaments of different materials. For example, one preset mode can operate the heater system with 5 Watts of electricity, e.g., at 5 volts and 1 amp, and the extrusion device to operate at 6 Watts, e.g., at 5 volts and 1.2 amps, which may allow the extrusion device to be powered by a USB port.

In some embodiments, the heater system 104 can comprise a heating element 318 and a heater mass 324. The heating element 318 can comprise wire, which can be metal, such as, for example, nichrome. The heating element 318 can be attached to a film 320. The film can comprise a polymer, such as, for example, polyimide. In some embodiments, the film comprises DuPont Kapton® polyimide film. In some embodiments, the heating element 318 can be embedded in the film 320. The heating element 318 and the film 320 can together form a heater wrap or band 302. In some embodiments, the heater system 104 can comprise a ceramic heater, e.g., a heater having a wire embedded in ceramic material.

The heater mass 324 can have a first end 324A, a second end 324B, and a passage 330 extending through the heater mass from the first end 324A to the second end 324B.

The heating element 318 can be coupled to the heater mass 324. The heating element 318 can be attached directly to the heater mass 324, or attached by the film 320, a bonding agent, or a combination thereof. The bonding agent can be a thermally conductive compound, which may be an adhesive. The heating element 318 receives electrical energy through a pair of leads 322 attached thereto. Heat generated by heating element 318 is transferred to the heater mass 324, directly or, if present, the film 320 and/or bonding agent. The heater mass 324 conducts heat received from the heating element 318 to the filament 700.

The heater mass 324 can act as a thermal capacitor, storing heat received from the heating element 318 and distributing the heat around the filament 700. The heat received by the filament 700 causes the material of the filament to melt, changing phase from solid to liquid. The melted material of the filament is then extruded through the outlet 206. In some embodiments, the heating element 318 and heater mass 324 can be formed as a single component. The heater mass 324 can be a single component or a plurality of component. In some embodiments, the heating element 318 comprises a wire wound around the heater mass 324, the outlet 206, a tube 306, or other component(s) surrounding segment of the filament pathway 221.

The heater mass 324, if present, can be attached, directly or indirectly, to the outlet 206. The heater mass can comprise an attachment portion 328 at or near an end of the heater mass. The heater mass comprises a first end 324A and an opposing second end 324B. The heater mass can comprise a body portion 326 extending from the first end 324A toward the second end 324B to the attachment portion 328, and can have a length less than a total length of the heater mass 324. The attachment portion 328 can extend from the body portion 326 to the second end 324B. The body portion 326 can have a larger outer cross-sectional dimension, e.g., diameter, than the attachment portion 328. The attachment portion 328 includes features, such as, for example, threads extending along the outer surface thereof, for attachment to the outlet 206. The attachment portion 328 can comprise a beveled outer edge at the second end 324B. The beveled outer edge can form a frustoconical surface in some embodiments.

FIG. 5B illustrates the outlet 206 comprising a passage having an attachment portion 340, a tapering portion 342, and a beveled edge 344 therebetween. The beveled edge 344 can form a frustoconical surface. The inside surface of the attachment portion 340 includes features, such as, for example, threads extending along the inner surface thereof, configured to mate with attachment portion 328, e.g. threads, of the heater mass 324. The heater mass 324 and outlet 206 are coupled such that the attachment portion 328 of the heater mass 324 extends into the attachment portion 340 of the outlet 206. When attachment portions 328, 340 are coupled together, the beveled edges, if present, of the heater mass 324 and outlet 206 engage each other, preferably in sealing contact. The mated beveled edges inhibit or prevent leakage of the melted material of the filament between the heater mass 324 and outlet 206. Additionally or alternatively, the attachment portions 328, 340, e.g., threaded surfaces inhibit or prevent leakage of the melted material of the filament between the heater mass 324 and outlet 206.

The melted material of the filament is received into the tapered portion 342 of the outlet 206. The tapered portion 342, having a cross-section that reduces with proximity to the exit of the outlet, directs the melted material to the outlet exit. In some embodiments, the outlet 206 can comprise a nozzle, a sleeve, or a tapered body having a passage therethrough. In some embodiments, the outlet 206 can be unitarily formed with the heater mass 324.

The heater mass 324 can be configured to attach to a tube 306, shown for example in FIGS. 4A-6A and 7. The passage 330 of the heater mass 324 can include a receiving segment 330A extending from the first end 324A toward the second end 324B. The receiving segment can have a length less than a total length of the heater mass 324. The receiving segment can have a constant inner cross-sectional dimension, e.g., diameter to receive an end portion of the tube 306 therein. If the heater mass 324 and tube 306 are present, the heater mass can be disposed between the tube 306 and the outlet 206.

The passage 330 of the heater mass 324 can include a tapering segment 330B, which, if the receiving segment 330A is present, can extend from the receiving segment toward the second end 324B. The tapering segment 330B can extend through the second portion 328 to the second end 324B.

The heater mass 324 can comprises a slot 336 in some embodiments. The slot 336 extends through the wall of the body portion 326 at the receiving segment 330A.

In some embodiments, a retainer 338 can be disposed around the heater mass 324. The retainer can be configured to aid, reinforce, or protect coupling of the heating element 318 to the heater mass 324. The retainer 338 can be ring-shaped and disposed around the body portion 326 of the heater mass 324 with the heating element 318 between the retainer 338 and the body portion 326. The retainer 338 in various embodiments can extend partially or entirely around the circumference of the body portion 326. In some embodiments, the retainer 338 can comprise an adhesive or tape. The retainer 338 can be insulating in some embodiments.

The heater mass 324 can be separated from the heat sink 304 by a segment of the tube 306. The segment of the tube 306 separating the heater mass 324 from the heat sink 304 can have a tube wall thickness equal to or less than 0.4 mm. In some embodiments, the tube wall thickness can be equal to or less than 0.1 mm, 0.2 mm, or 0.3 mm. The small cross-sectional area of the segment can provide thermal resistance to the transmission of heat to other components of the extrusion device 200. The segment of the tube 306 between the heat sink 304 and heater mass 324 can dissipate a portion of heat generated by the heating element 318. In some embodiments, an entire length of a section of the tube 306 having a constant inner dimensions, e.g., diameter, has a wall thickness of equal to or less than 0.4 mm. In some embodiments, the wall thickness can be equal to or less than 0.1 mm, 0.2 mm, or 0.3 mm. The tube 206 can comprise or consist of stainless steel, aluminum, copper, brass, or a combination thereof. In some embodiments, the tube can comprise a segment that flares toward an inlet end of the tube.

The heater mass 324 can be connected, directly or indirectly, to a heat sink 304. The heater mass 324 can be connected to the heat sink 304 by the tube 306, if present. In some embodiments, the heat sink 304 and the tube 306 can be integrally formed as a single monolithic component. In some embodiments, the tube 306 and the heater mass 324 can be integrally formed as a single monolithic component. In some embodiments, the heat sink 304, the tube 306, and the heater mass 324 can be integrally formed as a single monolithic component. In some embodiments, the tube 306 can be attached to the heat sink 304 and the heater mass 324 by, for example, brazing, welding, press fit, adhesive, or other method.

Referring to FIG. 7, the heat sink 304 comprises a body having first end 304A, a second end 304B, and a passage 310 extending from the first end to the second end. The passage 310 can be a hole positioned through the heat sink such that the material of the heat sink surrounds a complete, closed circumference of the passage 310. A plurality of fins 308 is disposed around the perimeter of the heat sink 304. Each fin 308 extends all or, alternatively, a portion of the total distance from the first end 304A to the second end 304B. The fins 308 can be disposed on opposing lateral sides of the heat sink, as illustrated for example in FIG. 7. In some embodiments, the fins 308 are disposed around the entire perimeter of the heat sink 304. The fins can be formed as a plurality of passages extending from the first end to the second end. The fins 308 increase the surface area available for heat dissipation.

The tube 306 can be disposed in the passage 310 of the heat sink 304. In embodiments, the tube extends through the heat sink from the first end 304A to the second end 304B. A first portion of the tube can be disposed in the passage 310 and a second portion of the tube can extend from the second end 304B of the heat sink 304 toward the outlet 206.

A portion of the inside surface of the tube 306 can comprise a coating 346. The coating 346 can be heat-insulating, lubricous, or both. In some embodiments, the coating 346 comprises PTFE or a material having a PTFE-based formula, such as, for example, Teflon®. The tube can have a first end 306A and a second end 306B. The second end 306B can be closer to the outlet 206 than is the first end 306A. In some embodiments, the coating extends from the first end 306A into the tube 306 toward the second end 306B. In some embodiments, the distance that the coating extends within the tube 306 is sufficient and the coating is positioned with in the tube such that when the tube 306 and heat sink 304 are assembled, the coating spans the length of the passage 310. In some embodiments, the coating can extend beyond the first end 304A and the second end 304B of heat sink when the tube is attached thereto. In some embodiments, the coating extends 50% or more, or 75% or more of the total length of the heat sink between the first end 304A and the second end 304B.

The heat sink 304 can have a receptacle 312, which may extend through the heat sink 304 from the first end 304A to the second end 304B, configured to support an end of the filament-engaging mechanism 214. All or a portion of an inner surface of the receptacle 312 can have a coating 313

(see FIG. 5B), similar to the coating 346 of the tube 306, and can be heat-insulating, lubricous, or both. In some embodiments, the coating 313 of the receptacle 312 comprises PTFE or a material having a PTFE-based formula, such as, for example, Teflon®. In some embodiments, the coating 313 extends from the first end 304A into the receptacle 312 toward the second end 304B. In some embodiments, the coating extends the entire length of the receptacle 312. In some embodiments, the coating 313 can extend from the first end 304A toward the second end 304B 50% or more, or 75% or more of the total length of the heat sink between the first end 304A and the second end 304B. In some embodiments, a bushing or a bearing can be received in the receptacle 312.

In some embodiments, a side 315 of the heat sink 304 closer to the filament-engaging mechanism 214, e.g., a side at the first end 304A, can have a coating 313' (see FIG. 7), similar to the coating 313 of the receptacle 312 and/or the coating 346 of the tube 306. The coating 313' can be heat-insulating, lubricous, or both. In some embodiments, the coating 313' comprises PTFE or a material having a PTFE-based formula, such as, for example, Teflon®. In some embodiments, the coating 313' extends from the receptacle 312 to the passage 310. In some embodiments, the coating 313' covers an entire surface area of the heat sink 304 facing toward the filament-engaging mechanism 214. In some embodiments, the coating 313' is contiguous with the coating 313.

A top portion of the heat sink 304, between the lateral sides, can comprise a retaining feature configured to retain a printed circuit board (PCB). The retaining feature can comprise a pair of rails 314 extending from the first end 304A to the second end 304B of the heat sink 304. In some embodiments, the PCB is disposed between the rails 314.

The heat sink 304 can be disposed between the filament-engaging mechanism 214 and the outlet 206, as illustrated for example in FIGS. 5A and 5B. The heat sink 304 can be disposed between the filament-engaging mechanism 214 and the heating element 318. The heat sink 304 is oriented such that the first end 304A faces the second end 202B of the control member 202 and the second end 304B faces toward the outlet 206. Further, the heat sink 304 is aligned with the filament-engaging mechanism 214 and tube 306 such that a filament urged toward the outlet 206 by the filament-engaging mechanism 214 enters the tube 306 in the passage 310, and a portion of the filament-engaging mechanism 214 is coupled with the receptacle 312.

In some embodiments, the extrusion device 200 comprises a cooling system 108. The cooling system 108 can comprise an impeller 402 driven by a fan motor 406. The impeller 402 can be configured to draw air into the housing 208 through apertures 404 in the housing 208. In some embodiments, the apertures are disposed through the rear cover 212.

The impeller 402 can direct air drawn into the housing 208 toward the outlet 206 and along the drive system 102 and heater system 104 to cool them. Air moving through the housing 208 toward the outlet 206 passes over the heat sink 304 and between the fins 308, facilitating dissipation of heat. The air is pushes out of the housing 208 through an annular space 408 (see FIG. 3) between (a) the heater mass 324 and/or outlet 206 and (b) the housing 8, e.g., the front cover 210.

In some embodiments, the impeller 402 is driven by the drive system motor 216. In some embodiments, the impeller 402 is driven by power take-off of the drive system motor 216 or power transmission system 218.

Referring to FIGS. 4A and 6A, comprises the control system 106 of the extrusion device 200 is configured to control operation of the drive system 102 in response to operation of an input mechanism. The control system 106 can comprise one or more printed circuit boards (PCB's). FIG. 4A illustrates a main PCB 410 and a secondary PCB 412. Attached to the PCB's, e.g., the main PCB 410 and/or the secondary PCB 412, are a power port 426, a processor, memory, non-transitory computer-readable medium, and input mechanisms to control operation of the extrusion device 200. In some embodiments, the non-transitory computer-readable medium is configured for storage of programming, including, for example, heater control algorithms. In some embodiments, the input mechanisms attached to the main PCB 410 comprise a primary port 414, a secondary port 416, a switch 128, and a potentiometer, e.g., a variable resistor 420. In some embodiments, the main PCB 410 is positioned such that all of the input mechanism is accessible to a user, such as, for example, through corresponding openings in the housing 208. In some embodiments, the input mechanisms extend through the housing 208. In some embodiments, the secondary port 416 is concealed by a removable ring 424 disposed around the primary port 414. In certain embodiments, an indicator 428 (FIG. 2A), for example an LED, can be provided to indicate that the extrusion device 200 is in a particular state of operation. In some embodiments, the power receptacle 426 extends through an opening in the rear cover 212.

The primary port 414 permits control of the extrusion device 200 using an input mechanism coupled to the primary port 414. For example, an input mechanism such as a personal computer, mobile phone, remote control, foot pedal, or other mechanism may be coupled to the primary port 414. The secondary port 416 permits access to a control system 106 of the extrusion device 200, for example to reprogram the processor and/or non-transitory computer-readable medium. The switch 418 changes the heater control algorithm between preset modes.

The secondary PCB 412, if present, is linked to the main PCB 410, for example by a data link or a bus. In some embodiments, the secondary PCB 412 is coupled to and supported by the rails 314 of the heat sink 304 and a portion of the power transmission system. In some embodiments, standoffs are disposed between the heat sink 304 and secondary PCB 412, and can inhibit or prevent heat transfer to the PCB. In some embodiments, the secondary PCB 412 is coupled to the housing 208 or other components of the extrusion device 200. The secondary PCB 412 can be attached to one or more input mechanism, and can be coupled to the leads 322 of the heating element 318.

In some embodiments, the secondary PCB 412 is operatively attached to an input mechanism configured to control operation of the drive system 102. The input mechanism can comprise, for example, one or more buttons. A first button 450 and a second button 452 can be positioned to allow the user to actuate them while holding and supporting the extrusion device 200 in a single hand, for example as illustrated in FIGS. 2A and 2B. In embodiments that omit a secondary PCB 412, the disclosed features of the secondary PCB 412 can be incorporated in the main PCB 410. If embodiments that include a secondary PCB 412, any of the disclosed features of the secondary PCB 412 can be incorporated in the main PCB 410.

Figure 13:
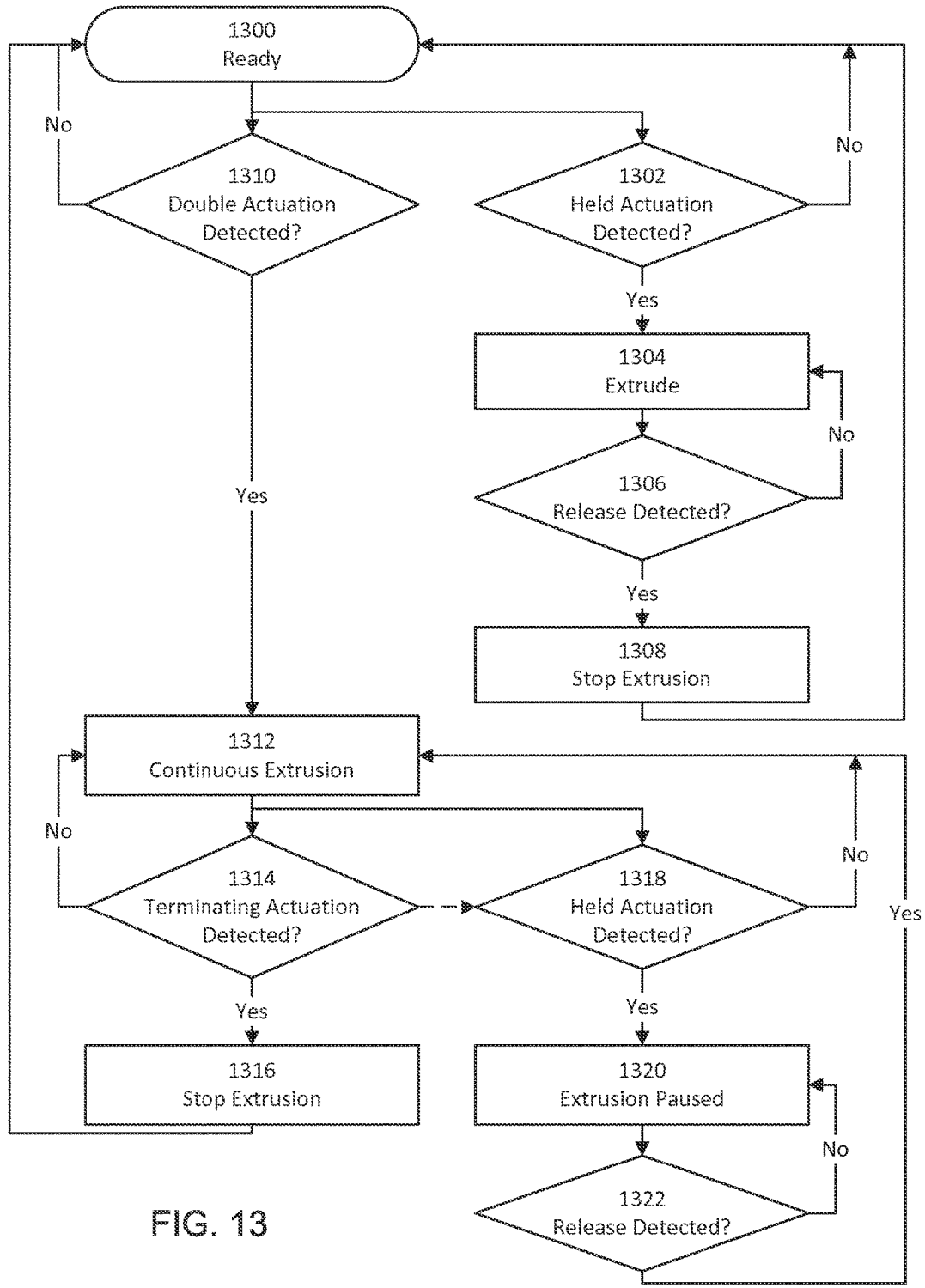
FIG. 13 is a flowchart illustrating an exemplary control process according to some aspects of the subject technology.

FIG. 13 is a flowchart illustrating operation of a control module configured to control operation of extrusion devices according to certain aspects of the subject technology. In particular, the control module can control operation of the drive system 102, the heater system 104, and, if present, the cooling system 108 in response to operation of the input mechanism selectively to extrude a filament. In some embodiments, the input mechanism comprises the first button 450, the second button 452, a device coupled to the primary port 414, secondary port 416, or another input mechanism or a combination of input mechanisms.

With the extrusion device in a ready state, shown at block 1300, actuation of the input mechanism is detected. If the control module detects actuation of the input mechanism which is held, shown at block 1302, the control module directs the drive system to urges the filament toward the nozzle for continuous extrusion, as shown at block 1304. Release of the input mechanism, as illustrated at block 1306, stops extrusion of the filament, as illustrated at block 1308, and returns the control module to the ready state 1300.

With the extrusion device in the ready state, shown at block 1300, if the control module detects actuation of the input mechanism two times within a defined period of time, e.g., a double-click, shown at block 1310, the control module initiates a continuous flow mode in which the control module directs the drive system to urges continuously the filament toward the nozzle for continuous extrusion, as shown at block 1312. Detection of inputs other than actuation of the input mechanism two times within a defined period of time can prompt the control module to initiate the continuous flow mode. For example, the control module can initiate the continuous flow mode when actuation of the input mechanism is detected three times within a defined period of time.

While in the continuous extrusion mode 1312, if the control module detects actuation of the input mechanism two times within a defined period of time, e.g., a double-click, shown at block 1314, the control module terminates the continuous extrusion mode, stopping extrusion as shown at block 1316, and returns to the ready state 1300. In some embodiments, actuation and release of two input mechanisms, e.g., the first button 450 and the second button 452 at the same time, e.g., concurrently or simultaneously, is detected by the control module as a double actuation at blocks 1310 and/or 1314, and in response initiations and terminates, respectively, the continuous flow mode. While in the continuous extrusion mode 1312, detection of inputs other than actuation of the input mechanism two times within a defined period of time can prompt the control module to terminate the continuous flow mode. For example, the control module can terminate the continuous flow mode when a single actuation and release of the input mechanism is detected within a defined period of time. As another example, the control module can terminate the continuous flow mode when actuation of the input mechanism is detected three times within a defined period of time.

While in the continuous extrusion mode 1312, if the control module detects actuation of the input mechanism which is held longer than a predetermined minimum period of time, shown at block 1318, the control module directs the drive system so as to pause extrusion of the filament, as shown at block 1320. When release of the input mechanism is then detected, as illustrated at block 1322, the control module directs the drive system so as to resume extrusion in the continuous extrusion mode 1312. The predetermined period of time of holding that prompts the control module to pause extrusion can be, for example, 0.5 second, 1 second, or 2 seconds, in various embodiments. In some embodiments, the determination at block 1318 can follow from the determination at block 1314.

In some embodiments, with the extrusion device at the ready state shown at block 900, if actuation of two input mechanisms, e.g., the first button 450 and the second button 452, at the same time, e.g., concurrently or simultaneously, is detected, the control module initiates a reverse mode in which the direction of rotation of the drive motor 216 is reversed, and the filament-engaging mechanism 214 urge the filament 700 away from the outlet 206. In response to release of the input mechanisms, the control module directs the drive system 102 so as to terminate the reverse mode and return to the ready state.

In some embodiments, in response to double actuation of the first button 450 at block 910, the control module directs the drive system 102 so as to extrude the filament at a first rate. In some embodiments, in response to double actuation of the second button 452, the control module directs the drive system 102 to extrude the filament at a second rate, different than the first rate.

Figure 14:
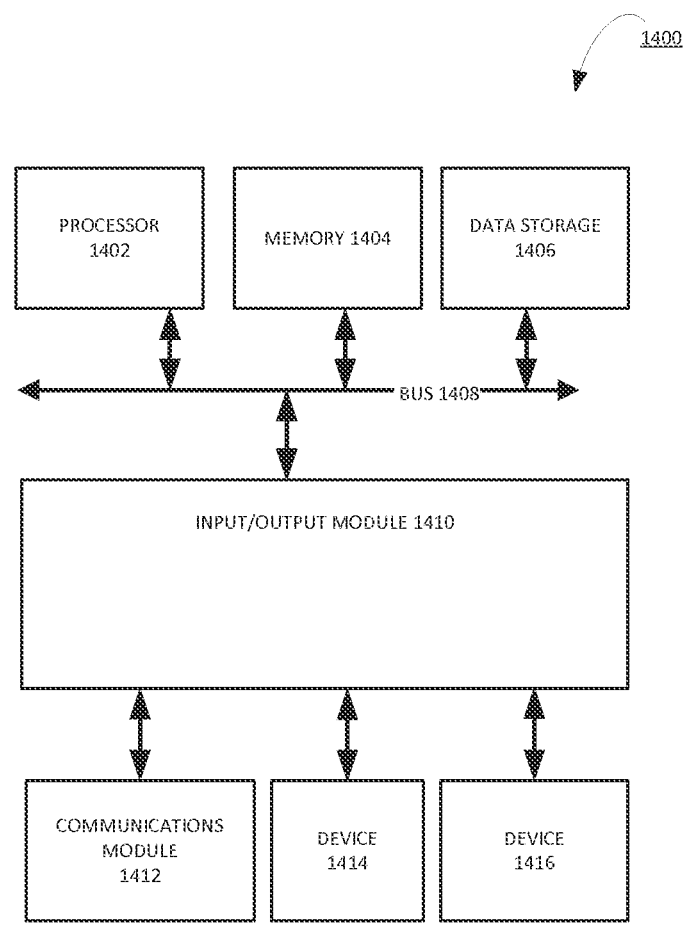
FIG. 14 is an exemplary diagram of a computer system implementing methods of the subject technology.

FIG. 14 is a block diagram illustrating an exemplary control system 1400 with which the control system 102 can be implemented. In certain aspects, the computer system 1400 can be implemented using hardware or a combination of software and hardware, and can be distributed across multiple entities.

The computer system 1400 includes a bus 1408 or other communication mechanism for communicating information, and a processor 1402 coupled with bus 1408 for processing information. By way of example, the computer system 1400 may be implemented with one or more processors 1402. Processor 1402 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

The computer system 1400 can include, in addition to hardware, code that creates an execution environment for the computer program implementing the control processes disclosed herein, e.g., code that constitutes processor firmware, a protocol stack, a database management system, an operating system, or a combination of one or more of them stored in an included memory 1404, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 1408 for storing information and instructions to be executed by processor 1402. The processor 1402 and the memory 1404 can be supplemented by, or incorporated in, special purpose logic circuitry.

The instructions may be stored in the memory 1404 and implemented in one or more computer program products, i.e., one or more control systems 106 of computer program instructions encoded on a computer readable medium for execution by, or to control the operation of, the computer system 1400, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, datastructured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 1404 may also be used for storing temporary variable or other intermediate information during execution of instructions to be executed by processor 1402.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 1400 further includes a data storage device 1406 such as a magnetic disk or optical disk, coupled to bus 1408 for storing information and instructions. Computer system 1400 may be coupled via input/output module 1410 to various devices (e.g., input mechanisms). The input/output module 1410 can be any module having an input/output. Exemplary input/output modules 1410 include data ports such as USB ports. The input/output module 1410 is configured to connect to a communications module 1412. Exemplary communications modules 1412 include networking interface cards, such as Ethernet cards and modems. In certain aspects, the input/output module 1410 is configured to connect to a plurality of devices, such as an input device 1414 (e.g., first button 450 or second button 452) and/or an output device 1416 (e.g., motor 216). Exemplary input devices 1414 include a keyboard and a pointing device, e.g., a mouse or a trackball, by which a user can provide input to the computer system 1400. Other kinds of input devices 1414 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 1416 include display devices, such as a CRT (cathode ray tube) or LCD (liquid crystal display) monitor, for displaying information to the user.

According to one aspect of the present disclosure, operation of control system 142 can be implemented using a computer system 1400 with a processor 1402 executing one or more sequences of one or more instructions contained in memory 1404. Such instructions may be read into memory 1404 from another machine-readable medium, such as data storage device 1406. Execution of the sequences of instructions contained in main memory 1404 causes processor 1402 to perform the process steps described herein. One or more processors in a multi-processing arrangement may also be employed to execute the sequences of instructions contained in memory 1404. In alternative aspects, hard-wired circuitry may be used in place of or in combination with software instructions to implement various aspects of the present disclosure. Thus, aspects of the present disclosure are not limited to any specific combination of hardware circuitry and software.

The term "machine-readable storage medium" or "computer readable medium" as used herein refers to any medium or media that participates in providing instructions to processor 1402 for execution. Such a medium may take many forms, including, but not limited to, non-volatile media, volatile media, and transmission media. Non-volatile media include, for example, optical or magnetic disks, such as data storage device 1406. Volatile media include dynamic memory, such as memory 1404. Transmission media include coaxial cables, copper wire, and fiber optics, including the wires that comprise bus 908. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Terms such as "top," "bottom," "front," "rear" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

Furthermore, to the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Underlined and/or italicized headings and subheadings are used for convenience only, do not limit the subject technology, and are not referred to in connection with the interpretation of the description of the subject technology. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While certain aspects and embodiments of the subject technology have been described, these have been presented by way of example only, and are not intended to limit the scope of the subject technology. Indeed, the novel methods and systems described herein may be embodied in a variety of other forms without departing from the spirit thereof. The accompanying claims and their equivalents are intended to cover such forms or modifications as would fall within the scope and spirit of the subject technology.

What is claimed is:

1. A handheld extrusion device comprising:
a three-dimensional (3D) pen configured to fit in a user's hand and shaped to allow manipulation thereof like a pen, the 3D pen comprising a housing, a control member, a filament-engaging mechanism, a heat sink, a heater, and a tube;
the housing having an aperture disposed at a proximal end portion thereof for introducing a filament into the device, an outlet disposed at a distal end portion thereof wherefrom the filament is extruded, and a filament pathway extending between the aperture and the outlet, the filament pathway having a proximal portion adjacent to the aperture and a distal portion adjacent to the outlet, the filament pathway sloping from the proximal portion to the distal portion to redirect the filament passing therethrough;
the filament-engaging mechanism comprising a helical screw thread, the screw thread disposed along the filament pathway for engaging and urging the filament toward the outlet;
the control member coupled relative to the housing and extending inwardly within an inner volume of the housing to define a portion of the filament pathway, the control member comprising an upper portion and a ramp portion, the control member being disposed longitudinally opposite the filament-engaging mechanism with the upper portion having a length at least about equal to a longitudinal extent of the screw thread for facilitating cooperative engagement of the filament between the filament-engaging mechanism and the control member;
the heat sink having a passage there through;
the heater having a passage there through;
and the tube having a first portion coupled with the heat sink and aligned with the filament pathway, and a second portion coupled with the heater such that the heat sink is spaced from the heater along the tube.

2. The handheld extrusion device of claim 1, wherein the tube comprises PTFE or a material having a PTFE-based formula.

3. The handheld extrusion device of claim 1, wherein the heater comprises a heater mass and a heating element, and wherein at least a portion of the heater mass is disposed between the heating element and the tube.

4. The handheld extrusion device of claim 1, wherein the tube comprises a flared portion at a location opposite the second portion relative to the first portion, and that flares away from the first portion.

5. The handheld extrusion device of claim 1, wherein the distal portion of the filament pathway extends parallel relative to the proximal portion of the filament pathway.

6. The handheld extrusion device of claim 1, wherein the filament pathway slopes from the proximal portion toward the filament-engaging mechanism.

7. The handheld extrusion device of claim 1, further comprising a routing rail positioned along the proximal portion of the filament pathway, between the aperture and the filament-engaging mechanism, the routing rail comprising a flat portion and a slope portion.

8. The handheld extrusion device of claim 7, wherein the slope portion of the routing rail extends between the flat portion of the routing rail and the filament-engaging mechanism.

9. The handheld extrusion device of claim 7, wherein a portion of the filament pathway is defined between the flat portion of the routing rail and the housing.

10. The handheld extrusion device of claim 1, wherein the filament pathway is formed at least in part by the housing.

11. The handheld extrusion device of claim 1, wherein the proximal portion of the filament pathway extends adjacent to the housing.

12. The handheld extrusion device of claim 1, wherein the distal portion of the filament pathway is spaced apart from the housing.

13. The handheld extrusion device of claim 1, wherein the tube extends along the distal portion of the filament pathway between the filament-engaging mechanism and the outlet.

14. The handheld extrusion device of claim 1, wherein the control member comprises a ramp portion and a flat portion, the ramp portion extending transversely relative to a longitudinal axis of the 3D pen.

15. The handheld extrusion device of claim 1, wherein a plane extending normal to a longitudinal axis of the 3D pen extends through both the upper portion and the filament-engaging mechanism.

16. The handheld extrusion device of claim 1, wherein the control member is configured to move relative to the housing.

17. An extrusion device comprising:
- a three-dimensional (3D) pen configured to fit in a user's hand and shaped to allow manipulation thereof like a pen, the 3D pen comprising a housing, a control member, a filament-engaging mechanism, a heat sink, and a heater;
- the housing having an aperture disposed at a proximal end portion thereof for inserting a filament into the housing, an outlet disposed at a distal end portion thereof wherefrom the filament is extruded, and a filament pathway extending between the aperture and the outlet, the filament pathway having a proximal portion adjacent to the aperture and a distal portion adjacent to the outlet, the filament pathway curving from the proximal portion to the distal portion to redirect the filament passing therethrough;
- the filament-engaging mechanism comprising a helical screw thread, the screw thread positioned along the filament pathway and configured to engage and move the filament along the filament pathway;
- the control member coupled relative to the housing and comprising an upper portion and a ramp portion extending inwardly within an inner volume of the housing to define a portion of the filament pathway, the control member being disposed longitudinally opposite the filament-engaging mechanism with the upper portion extending along a longitudinal extent of the screw thread for facilitating cooperative engagement of the filament between the filament-engaging mechanism and the control member;
- the heater disposed along the filament pathway;
- and the heat sink disposed along the filament pathway intermediate the filament engaging mechanism and the heater.

18. The extrusion device of claim 17, wherein the distal portion of the filament pathway extends parallel relative to the proximal portion of the filament pathway.

19. The extrusion device of claim 17, wherein the sloped portion of the filament pathway slopes from the proximal portion toward the filament-engaging mechanism.

20. The extrusion device of claim 17, wherein the filament pathway is formed at least in part by the housing.

21. The extrusion device of claim 17, wherein the proximal portion of the filament pathway extends adjacent to the housing.

22. The extrusion device of claim 17, wherein the distal portion of the filament pathway is spaced apart from the housing.

23. The extrusion device of claim 17, comprising a routing rail positioned along the proximal portion of the filament pathway, and between the aperture and the filament-engaging mechanism, wherein a portion of the filament pathway is defined between the routing rail and the housing.

* * * * *